US010301546B2

(12) United States Patent
Sasaki et al.

(10) Patent No.: US 10,301,546 B2
(45) Date of Patent: May 28, 2019

(54) LIQUID CRYSTAL DISPLAY ELEMENT AND LIQUID CRYSTAL DISPLAY

(71) Applicant: DIC Corporation, Tokyo (JP)

(72) Inventors: Tsuyoshi Sasaki, Kita-adachi-gun (JP); Hidenari Akiyama, Kita-adachi-gun (JP); Yasuo Umezu, Kita-adachi-gun (JP); Kazunori Maruyama, Kita-adachi-gun (JP); Haruki Ohishi, Kita-adachi-gun (JP); Shinji Ogawa, Kita-adachi-gun (JP); Yoshinori Iwashita, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 15/765,790

(22) PCT Filed: Oct. 20, 2016

(86) PCT No.: PCT/JP2016/081065
§ 371 (c)(1),
(2) Date: Apr. 4, 2018

(87) PCT Pub. No.: WO2017/069187
PCT Pub. Date: Apr. 27, 2017

(65) Prior Publication Data
US 2018/0282626 A1 Oct. 4, 2018

(30) Foreign Application Priority Data
Oct. 22, 2015 (JP) .................................. 2015-207881

(51) Int. Cl.
C09K 19/58 (2006.01)
G02F 1/1337 (2006.01)
(Continued)

(52) U.S. Cl.
CPC ............ C09K 19/586 (2013.01); C09K 19/02 (2013.01); C09K 19/588 (2013.01); G02F 1/13 (2013.01);
(Continued)

(58) Field of Classification Search
CPC ................. C09K 19/586; G02F 1/1337; G02F 2001/133738; G02F 1/134363; G02F 2001/134372
See application file for complete search history.

(56) References Cited

U.S. PATENT DOCUMENTS 5,477,358 A * 12/1995 Rosenblatt ............ G02F 1/1393
349/130
2005/0041197 A1 * 2/2005 Ionescu .............. C09K 19/0403
349/185
(Continued)

FOREIGN PATENT DOCUMENTS

JP 2000-162574 A 6/2000
JP 2000162574 A * 6/2000
(Continued)

OTHER PUBLICATIONS

International Search Report dated Jan. 17, 2017, issued in counterpart International Application No. PCT/JP2016/081065 (2 pages).

Primary Examiner — Jia X Pan
(74) Attorney, Agent, or Firm — Westerman, Hattori, Daniels & Adrian, LLP

(57) ABSTRACT

The liquid crystal display element uses a liquid crystal composition which has a negative value of dielectric anisotropy ($\Delta\varepsilon$) and is designed to improve light transmittance adjusting an elastic constant, and a liquid crystal display including the liquid crystal display element. The liquid crystal display element uses a liquid crystal composition having a dielectric anisotropy ($\Delta\varepsilon$) of less than −1.5, in which a value of $\Gamma$ of the liquid crystal composition is 0.3 or less, and the value of $\Gamma$ is obtained from Equation (2) using measured values of a splay elastic constant ($K_{11}$) and a bend elastic constant ($K_{33}$) of the liquid crystal composition and a twist elastic constant ($K_{22}$) value obtained from Equation (1) using measured values of a threshold voltage (Continued)

(Vth), a bend elastic constant ($K_{33}$), vacuum permittivity ($\varepsilon_0$), a cell gap (d), and a helical pitch ($P_0$).

$$V_{th} = \pi \sqrt{\left\{1 - 4\left(\frac{K_{22}}{K_{33}}\right)^2 \left(\frac{d}{P_0}\right)^2\right\} \frac{K_{33}}{|\varepsilon_0 \Delta \varepsilon|}} \quad (1)$$

$$\Gamma = \frac{K_{22}}{K_{11} + K_{33}} \quad (2)$$

4 Claims, 6 Drawing Sheets

(51) Int. Cl.
  *G02F 1/1343* (2006.01)
  *G02F 1/1362* (2006.01)
  *G02F 1/13* (2006.01)
  *G02F 1/1368* (2006.01)
  *G02F 1/139* (2006.01)
  *C09K 19/02* (2006.01)

(52) U.S. Cl.
  CPC ............ *G02F 1/139* (2013.01); *G02F 1/1337* (2013.01); *G02F 1/1368* (2013.01); *G02F 1/13439* (2013.01); *G02F 1/134363* (2013.01); *G02F 1/136286* (2013.01); *G02F 2001/133738* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2007/0146603 A1* | 6/2007 | Uehara | G02F 1/134363 349/141 |
| 2009/0262291 A1* | 10/2009 | Scheffer | G02F 1/133753 349/123 |
| 2010/0276038 A1* | 11/2010 | Grellier | C21D 1/22 148/542 |
| 2012/0161072 A1 | 6/2012 | Saito et al. | |
| 2012/0168677 A1 | 7/2012 | Kobayashi et al. | |
| 2014/0292732 A1* | 10/2014 | Niioka | G02B 27/22 345/204 |
| 2017/0038614 A1* | 2/2017 | Zou | G02F 1/1309 |

FOREIGN PATENT DOCUMENTS

| | | |
|---|---|---|
| JP | 2006-63205 A | 3/2006 |
| JP | 2007-193324 A | 8/2007 |
| JP | 4556341 B2 | 10/2010 |
| JP | 2012-136623 A | 7/2012 |
| JP | 5637137 B2 | 12/2014 |

* cited by examiner

LIQUID CRYSTAL DISPLAY ELEMENT AND LIQUID CRYSTAL DISPLAY

TECHNICAL FIELD

The present invention relates to a liquid crystal display element and a liquid crystal display including the liquid crystal display element.

BACKGROUND ART

In the liquid crystal display element, a liquid crystal layer is sandwiched between a pair of substrates, and the liquid crystal layer contains a liquid crystal composition. Such liquid crystal display element is widely used in image display devices such as a liquid crystal television, a monitor for a computer, a mobile phone, an information terminal, and a game machine.

Representative examples of a display method of the liquid crystal display element include a twisted nematic (TN) type, a super twisted nematic (STN) type, an electrically controlled birefringence (ECB) type, and the like. Examples of an active matrix type liquid crystal display element using a thin-film transistor (TFT) include a VA type in which liquid crystal molecules are vertically aligned, and an in-plane switching (IPS) type in which liquid crystal molecules are horizontally aligned or a fringe field switching (FFS) type, which is a kind of the in-plane switching (IPS) type.

In these liquid crystal display elements, a nematic liquid crystal is used, and a liquid crystal composition whose dielectric anisotropy ($\Delta\varepsilon$) is positive or negative is used according to the kind of the element.

Meanwhile, investigation has been conducted on optimizing the liquid crystal composition by simulating the characteristics of the liquid crystal composition in a desired display mode using an elastic constant peculiar to the liquid crystal composition. It has been expected that, by adopting such method, an n-type liquid crystal composition can be developed with high efficiency. The behavior of the liquid crystal molecules can be described as three modes: splay, twist, and bend, depending on the external electric field. As for the elastic constant, there are a splay elastic constant (hereinafter, may be referred to as "$K_{11}$"), a twist elastic constant (hereinafter, may be referred to as "$K_{22}$"), and a bend elastic constant (hereinafter, may be referred to as "$K_{33}$"), corresponding to these modes.

As a method for optimizing the characteristics of the liquid crystal composition using $K_{11}$, and $K_{22}$, and $K_{33}$, for example, a method of preventing disarray of the arrangement of liquid crystal molecules (disclination) in the center portion of a pixel electrode or between the pixel electrodes fey selecting a liquid crystal composition satisfying relational expressions of $K_{33}/K_{11} \geq 1.5$ and $1.7 \leq (K_{33}/K_{22} - K_{33}/K_{11}) \leq 2.7$ and having an average transmittance of equal to or greater than 0.6 as the liquid crystal composition to be used in an IPS type or an FFS type liquid crystal display element, thereby enabling high definition display in a liquid crystal display element has been disclosed (refer to PTL 1). It is disclosed that, according to this method, the average light transmittance of the liquid crystal composition is improved by preventing disclination.

However, in PTL 1, there is no description regarding an n-type liquid crystal composition, and the method described in PTL 1 is not intended for an n-type liquid crystal composition. Furthermore, description was not made regarding improving light transmittance in PTL 1, and a method for measuring $K_{11}$, $K_{22}$, and $K_{33}$ of the n-type liquid crystal composition is not disclosed in PTL 1 in the first place. Thus, validity of the measured values cannot be verified.

CITATION LIST

Patent Literature

[PTL 1] Japanese Patent 4556341

SUMMARY OF INVENTION

Technical Problem

The present invention has been made in view of the circumstances, and an object of the present invention is to provide a liquid crystal display element using a liquid crystal composition which is designed to improve light transmittance using an elastic constant and whose dielectric anisotropy ($\Delta\varepsilon$) value being negative, and a liquid crystal display including the liquid crystal display element.

Solution to Problem

The present invention provides a liquid crystal display element using a liquid crystal composition having: a dielectric anisotropy ($\Delta\varepsilon$) of less than $-1.5$ and a value of $\Gamma$ of 0.3 or less, and the value of $\Gamma$ is obtained from Equation (2) using a twist elastic constant ($K_{22}$) value obtained from Equation (1) using measured values of a threshold voltage (Vth); a bend elastic constant ($K_{33}$); vacuum permittivity ($\varepsilon_0$); a cell gap (d); and a helical pitch ($P_0$), and measured values of a splay elastic constant ($K_{11}$) and the bend elastic constant ($K_{33}$) of the liquid crystal composition.

[Math. 1]

$$V_{th} = \pi\sqrt{\left\{1 - 4\left(\frac{K_{22}}{K_{33}}\right)^2\left(\frac{d}{P_0}\right)^2\right\}\frac{K_{33}}{|\varepsilon_0\Delta\varepsilon|}} \quad (1)$$

$$\Gamma = \frac{K_{22}}{K_{11} + K_{33}} \quad (2)$$

The present invention also provides a liquid crystal display including the liquid crystal display element.

Advantageous Effects of Invention

According to the present invention, a liquid crystal display element using a liquid crystal composition which is designed to improve light transmittance using an elastic constant and whose dielectric anisotropy ($\Delta\varepsilon$) value is negative, and a liquid crystal display including the liquid crystal display element are provided.

DESCRIPTION OF EMBODIMENTS

<<Liquid Crystal Display Element>>

Figure 1:
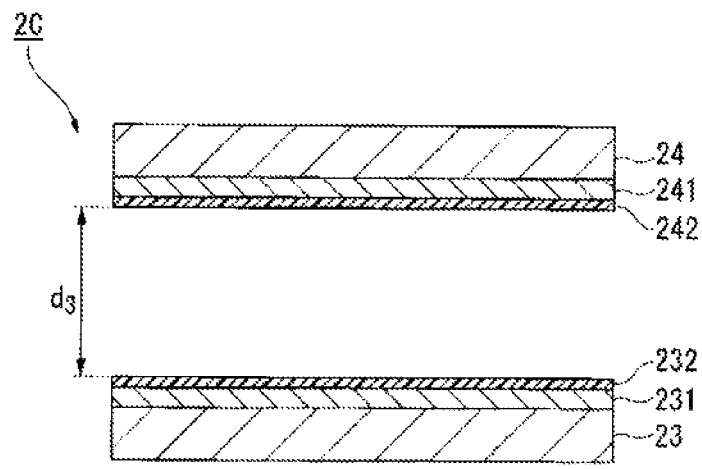
FIG. 1 is a cross-sectional view schematically showing main parts of one embodiment of a cell used in the present invention.

A liquid crystal display element of the present invention uses a liquid crystal composition having a dielectric anisotropy (Δε) of less than −1.5 and a value of Γ of 0.3 or less, wherein the value of Γ is obtained from Equation (2) using a twist elastic constant ($K_{22}$) value obtained from Equation (1) using measured values of a threshold voltage (Vth); a bend elastic constant. ($K_{33}$); vacuum permittivity ($\varepsilon_0$); a cell gap (d); and a helical pitch ($P_0$), and measured values of a splay elastic constant ($K_{11}$) and the bend elastic constant ($K_{33}$) with respect to the liquid crystal composition.

[Math. 2]

$$V_{th} = \pi \sqrt{\left\{1 - 4\left(\frac{K_{22}}{K_{33}}\right)^2\left(\frac{d}{P_0}\right)^2\right\}\frac{K_{33}}{|\varepsilon_0 \Delta \varepsilon|}} \quad (1)$$

$$\Gamma = \frac{K_{22}}{K_{11} + K_{33}} \quad (2)$$

The liquid crystal composition satisfying the specific condition of the Γ value obtained from Equation (2) being 0.3 or less exhibits high light transmittance (hereinafter, may be simply referred to as "transmittance") in a liquid crystal display element of a type which is driven by an electric field (horizontal electric field) having a component in a direction parallel to the surfaces of the substrates that interposes the liquid crystal composition therebetween. The liquid crystal display element using such liquid crystal composition has excellent characteristics. Thus, the liquid crystal display element of the present invention uses the liquid crystal composition designed to have excellent transmittance by using the splay elastic constant ($K_{11}$), the twist elastic constant ($K_{22}$), and the bend elastic constant ($K_{33}$).

In Equation (2), $K_{22}$ of the liquid crystal composition whose the dielectric anisotropy (Δε) is less than −1.5 is obtained from Equation (1) using the measured values of a threshold voltage (Vth), a bend elastic constant ($K_{33}$), a cell gap (d), and a helical pitch ($P_0$).

The liquid crystal composition used in the present invention is an n-type liquid crystal composition.

A method for obtaining $K_{22}$ of an n-type liquid crystal composition by using Equation (1) (a method for measuring $K_{22}$) is a novel method that has not been known in the related art. A method for measuring $K_{22}$ of a p-type liquid crystal composition has been disclosed in U.S. Pat. No. 8,168,083 so far, however, this method cannot be directly applied to an n-type liquid crystal composition. Although a method for measuring $K_{22}$ of an n-type liquid crystal composition has been disclosed in JP-A-8-178883 so far, the method for measuring $K_{22}$ in the present invention is extremely excellent from the viewpoint that $K_{22}$ can be measured with higher accuracy than in the aforementioned method. First, the method for measuring $K_{22}$ in the present invention will be described below.

In a cell including electrodes and two (a pair of) substrates that face each other, a twist elastic constant ($K_{22}$) is obtained from Equation (1) by, for example, measuring an electrostatic capacity (C) of the cell filled with a liquid crystal composition serving as an object for measuring $K_{22}$, in a state in which the liquid crystal composition is interposed in the cell, and a voltage is applied between the electrodes, measuring a threshold voltage (Vth) from the electrostatic capacity (C), and using the threshold voltage (Vth), a helical pitch ($P_0$), a bend elastic constant ($K_{33}$), vacuum permittivity ($\varepsilon_0$), and dielectric anisotropy (Δε) of the liquid crystal composition, and cell gap (d) of the cell.

Among the parameters in Equation (1), the dielectric anisotropy (Δε) can be measured using a known method. That is, relative permittivity $\varepsilon_{//}$ in a long axis direction of a liquid crystal molecule is measured by enclosing the liquid crystal composition to be measured in a cell subjected to a vertical alignment treatment, and relative permittivity $\varepsilon_\perp$ in a short axis direction of the liquid crystal molecule is measured by enclosing the liquid crystal composition to be measured in a cell subjected to a horizontal alignment treatment. Using the difference in these measured values, the dielectric anisotropy (Δε) can be obtained ($\Delta\varepsilon = |\varepsilon_{//} - \varepsilon_\perp|$). Among the parameters in Equation (1), $\varepsilon_0$ represents vacuum permittivity.

The parameters in Equation (1) other than the dielectric anisotropy (Δε) are obtained using a cell having a specific cell gap (d). Here, the cell used to obtain these parameters may be the same as or different from the cell included in the desired liquid crystal display element.

The cell which is used when obtaining $K_{22}$ using Equation (1) will be described below.

As the two substrates of the cell, substrates formed of glass or a transparent insulating material having flexibility such as plastic can be used, or substrates formed of a non-transparent insulating material such as silicon may also be used. A transparent substrate having a transparent electrode is obtained by, for example, sputtering indium tin oxide (ITO) on a transparent substrate such as a glass plate.

The substrates oppose each other such that the transparent electrode is disposed on the inner side. In this case, the space between the substrates may be adjusted through a spacer. At this time, it is preferable that a thickness of a light control layer (a liquid crystal layer containing the liquid crystal composition) thus obtained is adjusted to 1 to 100 μm, and it is more preferable that the thickness is adjusted to 1.5 to 10 μm. In the case of using a polarizing plate, it is preferable that the product of refractive index anisotropy (Δn) of a liquid crystal and a cell gap (d) is adjusted such that the contrast becomes maximum. Examples of the spacer include glass particles, plastic particles, alumina particles, a column spacer formed of a photoresist material, and the like. Thereafter, a sealing agent such as an epoxy-based thermally curable composition is screen printed on the substrate in a form in which a liquid crystal inlet is provided, and the substrates are bonded to each other and heated, so as to thermally cure the sealing agent.

FIG. 1 is a cross-sectional view schematically showing main parts of one embodiment of the cell.

A cell 2C shown in the figure includes a pair of substrates: a first substrate 23 and a second substrate 24. On the surface of the first substrate 23 opposing (facing) the second substrate 24, a first electrode 231 and a first alignment film 232 are laminated in this order toward the second substrate 24. In addition, on the surface of the second substrate 24 opposing (facing) the first substrate 23, a second electrode 241 and a second alignment film 242 are laminated in this order toward the first substrate 23. The cell 2C is configured such that the liquid crystal composition is interposed between the first substrate 23 and the second substrate 24. The first alignment film 232 and the second alignment film 242 control the alignment state of the liquid crystal composition interposed between the substrates.

In FIG. 1, the reference sign $d_3$ represents a cell gap in the cell 2C.

The cell 2C is a cell used in a VA-type liquid crystal display element, and in the method for measuring an elastic constant in the present invention, such cell can be suitably used.

The cell shown in FIG. 1 is merely an example of a part of a cell that can be used in the present invention, and the cell that can be used in the present invention is not limited thereto. For example, in the present invention, the cell can be used by being modified in various ways within a scope that does not depart from the gist of the present invention.

Among the parameters in Equation (1), the threshold voltage (Vth) can be measured according to the following method.

That is, the electrostatic capacity (C) of the cell filled with the liquid crystal composition to be measured is measured in a state in which the liquid crystal composition is enclosed in the cell to interpose the liquid crystal composition between the electrodes, and an arbitrary voltage is applied between the electrodes. At this time, a relationship between the voltage and the electrostatic capacity (C) can be confirmed by changing the applied voltage and measuring the electrostatic capacities (C) at each voltage, and, in the course of increasing the voltage, there is a moment at which the electrostatic capacity (C) drastically increases in an almost or completely constant manner. The voltage at this moment is designated as the threshold voltage (Vth). A method for measuring the threshold voltage (Vth) is as described above.

Among the parameters in Equation (1), $K_{33}$ may be obtained by setting $P_0$ infinite, that is, by preparing a liquid crystal composition that does not contain a chiral compound as the liquid crystal composition to be measured and applying Equation (1) for the liquid crystal composition. The liquid crystal composition used for obtaining $K_{33}$ at this time may be a liquid crystal composition having the same composition as the liquid crystal composition to be measured for $K_{22}$ except that the composition does not contain a chiral compound. In the case where $P_0$ is infinite, Equation (1) is expressed as $Vth=\pi(K_{33}/\Delta\varepsilon)^{1/2}$, since $d/P_0$ becomes 0. Since both Vth and $\Delta\varepsilon$ can be experimentally calculated as described above, $K_{33}$ is obtained by substituting these values in the approximate equation of Equation (1).

Therefore, the method for obtaining $K_{33}$ in the present invention is completely different from the method for obtaining $K_{33}$ described in JP-A-8-178883, in which $K_{33}$ is obtained by solving a binary simultaneous equation, and according to the method for obtaining $K_{33}$ in the present invention, $K_{33}$ is obtained with higher accuracy than in the case of obtaining $K_{33}$ according to the method in JP-A-8-178883.

Among the parameters in Equation (1), the helical pitch ($P_0$) and the cell gap (d) are known values. For example, $d_3$ in FIG. 1 is an example of the cell gap (d).

The dielectric anisotropy ($\Delta\varepsilon$) of the liquid crystal composition according to the present invention is less than −1.5, as described above, and is preferably −10 or more and less than −1.5, more preferably −8 or more and less than −1.5, even more preferably −6 to −1.8, and particularly preferably −5 to −2. In the case where the dielectric anisotropy ($\Delta\varepsilon$) of the liquid crystal composition is less than the lower limit value, the liquid crystal composition responds to the change in the voltage applied for driving the liquid crystal composition with extreme sensitivity, and thus, gradation display becomes difficult. In the case where the dielectric anisotropy ($\Delta\varepsilon$) of the liquid crystal composition is greater than the upper limit value, the driving voltage increases, and it becomes impossible to respond to the demand for power saving. In general, a driving voltage of the liquid crystal display element of 5 V to 6 V is suitable for the gradation display and the demand for power saving, however, the driving voltage is not limited to this range.

In the present invention, the liquid crystal composition to be measured is required to be subjected to twist alignment such that the composition has a specific helical pitch ($P_0$). It is preferable that the liquid crystal composition is subjected to twist alignment by, for example, adding a chiral compound to the liquid crystal composition and applying a voltage between the electrodes. The chiral compound will be described in detail later.

Through the procedures, among the parameters in Equation (1), Vth, $\Delta\varepsilon$, and $K_{33}$ can be obtained. In addition, $P_0$ and d are known values. Therefore, $K_{22}$ becomes the only parameter in Equation (1) that is not defined. Thus, by substituting these five parameters in Equation (1), $K_{22}$ can be obtained.

Therefore, the method for obtaining $K_{22}$ according to the present invention is completely different from the method for obtaining $K_{22}$ as described in JP-A-8-178883, in which $K_{22}$ is obtained by solving a binary simultaneous equation, and according to the method for obtaining $K_{22}$ in the present invention, $K_{22}$ is obtained with higher accuracy than in the case of obtaining $K_{22}$ according to the method in JP-A-8-178883.

In the present invention, for example, threshold voltages (Vth) are measured by the method under the condition of varying $d/P_0$ values, and from the measured values of the obtained plurality of threshold voltages (Vth) and the corresponding plurality of $d/P_0$ values, a function can be derived, which uses Vth and $d/P_0$ as the variables, by performing regression calculation.

In order to cause the $d/P_0$ values to be varied, any one of d and $P_0$ may be varied, however, as will be described in Examples, in the case where the threshold voltage (Vth) is measured by varying $P_0$ while maintaining d constant, the accuracy of the function is higher than in the case where the threshold voltage (Vth) is measured by varying d while maintaining $P_0$ constant. In other words, error between the threshold voltage (Vth) calculated from the function derived by varying $P_0$ while maintaining d constant and the actual measurement value of the threshold voltage (Vth) is extremely small. Thus, when obtaining $K_{22}$ of the desired liquid crystal composition after obtaining $K_{33}$ from the threshold voltage (Vth) by the method, $K_{22}$ is obtained with high accuracy by setting d the same as in the case of obtaining $K_{33}$ and varying $P_0$ to obtain $K_{22}$.

In the present invention, the expression of the "cell gap (d) being constant" means that the cell gaps (d) are exactly the same as each other, or the difference in the cell gaps (d) is sufficiently negligibly small. For example, the difference in the cell gaps (d) is 0 to 1.2 μm.

In the present invention, the expression of the "helical pitch ($P_0$) being constant" means that the helical pitches ($P_0$) are exactly the same as each other, or the difference in the helical pitches ($P_0$) is sufficiently negligibly small. For example, the difference in the helical pitches ($P_0$) is 0 to 0.6 μm.

In order to measure the threshold voltage (Vth) by varying $P_0$, plural kinds of liquid crystal compositions having different $P_0$'s need to be used. As the plural kinds of liquid crystal compositions having different $P_0$'s, two or more kinds of liquid crystal compositions which contain one or two or more kinds of chiral compounds and which are different in the total contents of the chiral compounds or two or more kinds of liquid crystal compositions which contain chiral compounds having different helical twisting power are preferably used, and two or more kinds of liquid crystal compositions which contain chiral compounds having different helical twisting power and in which the contents of these chiral compounds are the same as each other are more preferably used. The accuracy in measuring $K_{22}$ is further improved by using such plural kinds of liquid crystal compositions. In general, in the case where the chiral compounds having different helical twisting power are used, different kinds of chiral compounds may be used. The helical twisting power will be described in detail later.

In the present invention, the cell gap (d) of the cell is preferably 3 to 200 μm, more preferably 3 to 150 μm, even more preferably 3.1 to 120 μm, still more preferably 3.2 to 100 μm, still more preferably 3.3 to 90 μm, still more preferably 3.4 to 80 μm, and still more preferably 3.5 to 70 μm when measuring $K_{22}$ and $K_{33}$. By setting the cell gap (d) to be equal to or greater than the lower limit value, the proportion of liquid crystal molecules farther away from the substrates becomes higher among the liquid crystal molecules interposed between the pair of substrates, and the proportion of liquid crystal molecules which receive a strong force that allows the molecules to be aligned in a direction vertical to the surface of the substrates, caused by the effect of the substrates subjected to an alignment treatment, becomes lower, thus further improving the accuracy in measuring $K_{22}$, which allows, for example, the threshold voltage (Vth) to be measured with higher accuracy. In addition, by setting the cell gap (d) to be equal to or less than the upper limit value, the effect of suppressing variation in the cell gaps (d) becomes higher in the entire regions of the substrate that determine the cell gap (d), thereby increasing uniformity in the cell gaps (d) of the cell.

The "cell gap (d)" in the present invention is obtained by the method described below.

The size of the cell gap (d) in the cell is preferably adjustable to a desired value. By using such cell and adjusting the size of the cell gap (d) to a desired size to perform measurement, it is not necessary to prepare plural kinds of cells. Furthermore, the measurement of an elastic constant such as $K_{22}$ and $K_{33}$ or the measurement of other parameters such as Vth required for the measurement of an elastic constant can be performed without replacing cells, and the method for measuring an elastic constant in the present invention can be simplified.

In the cell in which the size of the cell gap (d) can be adjusted, for example, only one substrate among the pair of (two) substrates may be adjustable to change the size of the cell gap (d), or both substrates may be adjustable to change the size of the cell gap (d) together.

Examples of a method for adjusting the substrate such that the size of the cell gap (d) changes include a method in which the position where one or both of the pair of substrates are disposed in the cell is changed in a direction orthogonal to the surfaces of these substrates. One method may be applied alone, or two or more methods may be used in combination.

In order to change the positions where the substrates are disposed in the cell, a cell including the substrates provided with an actuator including a piezoelectric element or the like may be used, and the substrates may be moved in the cell by driving the actuator.

Examples of a method for obtaining the cell gap (d) are not particularly limited, however, as shown below, from the viewpoint of conveniently obtaining the cell gap with high accuracy, a method for obtaining the cell gap by measuring an electrostatic capacity ($C_0$) of the cell when the cell filled with the liquid crystal composition is placed in the air, a method for obtaining the cell gap (d) by observing interfering light generated when the cell filled with the liquid crystal composition is irradiated with light, and the like can be used.

The method for obtaining the cell gap (d) by measuring the electrostatic capacity ($C_0$) is as follows.

The electrostatic capacity ($C_0$) is an electrostatic capacity of the cell in the case of applying a voltage sufficiently lower than the threshold voltage, when the cell filled with the liquid crystal composition is placed in the air. Here, the "voltage sufficiently lower than the threshold voltage" is, for example, approximately a voltage equal to or higher than the voltage (V) obtained by multiplying the threshold voltage by 0.1 and equal to or lower than the voltage (V) obtained by multiplying the threshold voltage by 0.9. As is well known, the cell gap (d) has a relationship represented by the following equation, along with the electrostatic capacity ($C_0$), the relative permittivity ($\varepsilon_{//}$) of the liquid crystal composition in the cell, the vacuum permittivity ($\varepsilon_0$), and an electrode area (S) of the cell. Here, since $\varepsilon_{//}$, $\varepsilon_0$, and S are known values, the cell gap (d) is obtained by measuring $C_0$.

$$C_0 = \varepsilon_{//} \cdot \varepsilon_0 \cdot S/d$$

Meanwhile, examples of the method for obtaining the cell, gap (d) by observing the interfering light include a method which is the same as the case of measurement by a rotating analyzer method using He—Ne laser light, based on the methods described in "T. Scheffer et. al., J. Appl. Phys. vol 48, p. 1783 (1977)" and "F. Nakano, et. al., JPN. J. Appl. Phys. vol. 19, p. 2013 (1980)".

A method for measuring a twist elastic constant ($K_{22}$) for an n-type liquid crystal composition with good accuracy was not available in the related art; however, according to the method for measuring an elastic constant in the present invention, the twist elastic constant ($K_{22}$) can be measured with high accuracy, and through this measurement process, the bend elastic constant ($K_{33}$) and the threshold voltage (Vth) can also be measured with high accuracy.

Examples of a device for measuring an elastic constant of the liquid crystal composition (hereinafter, may be simply abbreviated as a "measurement device") used when measuring the elastic constant of the liquid crystal composition include a device including a cell having electrodes and two facing substrates for interposing the liquid crystal composition serving as an object for measuring the twist elastic constant ($K_{22}$), a voltage application means for applying an arbitrary voltage between the electrodes, a measurement means for measuring an electrostatic capacity (C) of the cell filled with the liquid crystal composition in the state of applying a voltage between the electrodes, a means for measuring a threshold voltage (Vth) front the electrostatic capacity (C) measured by the measurement means, and an elastic constant determination means for determining the twist elastic constant ($K_{22}$) of the liquid crystal composition using Equation (1), by input of the helical pitch ($P_0$), the bend elastic constant ($K_{33}$), the vacuum permittivity ($\varepsilon_0$), and the dielectric anisotropy ($\Delta\varepsilon$) of the liquid crystal composition and the cell gap (d) of the cell.

The cell in the elastic constant measurement device is the same as the cell described for the method for measuring an elastic constant.

The voltage application means may be a known means that applies a voltage between the electrodes in the cell in the liquid crystal display element.

The measurement means may be a known means that can measure an electrostatic capacity when applying a voltage between the electrodes.

The voltage application means and the measurement means are generally electrically connected to the cell.

Examples of the means for measuring a threshold voltage (Vth) from the electrostatic capacity (C) measured by the measurement means (hereinafter, may be abbreviated as a "threshold voltage measurement means") include a means that can detect a change in the electrostatic capacity (C) when changing the voltage applied between the electrodes in the voltage application means, and it is preferable that an amount of change in the electrostatic capacity (C) which is equal to or higher than a certain value can be automatically detected. The threshold voltage measurement means may also serve as the measurement means.

The elastic constant determination means determines $K_{22}$ of the liquid crystal composition using Equation (1) based on the input values of the helical pitch ($P_0$), the bend elastic constant ($K_{33}$), the vacuum permittivity ($\varepsilon_0$), and the dielectric anisotropy ($\Delta\varepsilon$) of the liquid crystal composition and the cell gap (d) of the cell, and as such means, for example, an arithmetic unit such as a computer can be used.

The elastic constant measurement device may include, as a means for measuring dielectric anisotropy ($\Delta\varepsilon$) of the liquid crystal composition, a means for measuring relative permittivity $\varepsilon_{//}$ of the liquid crystal composition, a means for measuring relative permittivity $\varepsilon_\perp$ of the liquid crystal composition, and a means for calculating dielectric anisotropy ($\Delta\varepsilon$) based on the relative permittivity $\varepsilon_{//}$ and the relative permittivity $\varepsilon_\perp$.

Examples of the means for measuring relative permittivity $\varepsilon_{//}$ include a means which has a cell that has been subjected to a vertical alignment treatment and an LCR meter electrically connected to the cell.

Examples of the means for measuring relative permittivity $\varepsilon_\perp$ include a means which has a cell that has been subjected to a horizontal alignment treatment and an LCR meter electrically connected to the cell.

The means for calculating dielectric anisotropy ($\Delta\varepsilon$) is, for example, a means for calculating $\Delta\varepsilon$ of the liquid crystal composition by using the equation "$\Delta\varepsilon=|\varepsilon_{//}-\varepsilon_\perp|$", based on the input values of the relative permittivity $\varepsilon_{//}$ and the relative permittivity $\varepsilon_\perp$, and as such means, for example, an arithmetic unit such as a computer can be used. Among the parameters in Equation (1), $\varepsilon_0$ represents vacuum permittivity.

The elastic constant measurement device may include a means for measuring a cell gap (d).

Examples of the means for measuring a cell gap (d) include a means having a light source causing light to be incident on the cell, a measuring instrument for measuring a pitch of interference fringe of interfering light, and a unit for calculating a cell gap (d) in consideration of wavelength dispersion of refractive index of the liquid crystal composition, based on the input measured value of the pitch of the interference fringe.

Examples of the means for measuring a cell gap (d) include a means including a unit for measuring an electrostatic capacity ($C_0$) of the cell, and a unit for calculating a cell gap (d) by using the equation "$C_0=\varepsilon_{//}\cdot\varepsilon_0\cdot S/d$", based on the input values of the relative permittivity ($\varepsilon_{//}$) and the vacuum permittivity ($\varepsilon_0$) of the liquid crystal composition, the electrode area (S) of the cell, and the electrostatic capacity ($C_0$) of the cell.

As the unit for calculating a cell gap (d) based on the input measured value of the pitch of the interference fringe and the unit for calculating a cell gap (d) based on the input values of the relative permittivity ($\varepsilon_{//}$) and the vacuum permittivity ($\varepsilon_0$) of the liquid crystal composition, the electrode area (S) of the cell, and the electrostatic capacity ($C_0$) of the cell, an arithmetic unit such as a computer can be used.

Figure 2:
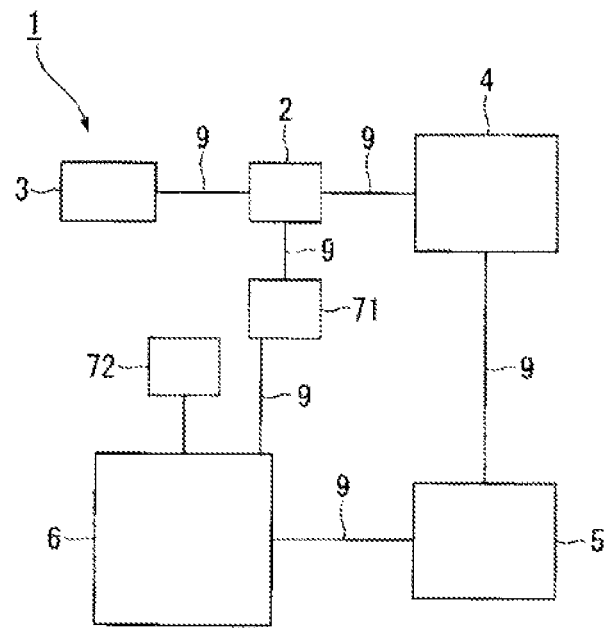
FIG. 2 is a schematic view showing one embodiment of an elastic constant measurement device in the present invention.

One embodiment of the elastic constant measurement device is schematically shown in FIG. 2. A measurement device 1 shown here includes a cell 2, a voltage application means 3, a measurement means 4, a threshold voltage measurement means 5, and an elastic constant determination means 6. In FIG. 2, a reference sign 9 represents a wiring.

As the cell 2 in the measurement device 1, for example, the cell 2C shown in FIG. 1 can be used.

In the measurement device 1, the voltage application means 3 and the measurement means 4 are electrically connected to the cell 2, and the threshold voltage measurement means 5 is electrically connected to the measurement means 4 and the elastic constant determination means 6. By having such configuration, for example, the device can set information regarding the electrostatic capacity (C) measured by the measurement means 4 to be automatically transmitted to the threshold voltage measurement means 5, and the threshold voltage (Vth) to be automatically obtained in the threshold voltage measurement means 5.

In the case where the measurement device 1 includes a means 71 for measuring a cell gap (d), it is preferable that the means 71 for measuring a cell gap (d) is electrically connected to the cell 2 and is set to be able to automatically measure the cell gap (d), and it is more preferable that the means 71 for measuring a cell gap (d) is electrically connected to the elastic constant determination means 6 and is set to be able to automatically input a measured value of the cell gap (d) to the elastic constant determination means 6.

In the case where the measurement device 1 includes a means 72 for calculating dielectric anisotropy ($\Delta\varepsilon$), it is preferable that the means 72 for calculating dielectric anisotropy ($\Delta\varepsilon$) is electrically connected to the elastic constant determination means 6 and is set to be able to automatically input a measured (calculated) value of the dielectric anisotropy ($\Delta\varepsilon$) to the elastic constant determination means 6.

The measurement device 1 is merely an example of a measurement device that can be used in the present invention. The elastic constant measurement device used in the present invention is not limited to this example and can be modified in various ways within a scope that does not depart from the gist of the present invention.

$K_{11}$ is obtained using a measurement method known in the related art.

For example, in the case where a high voltage (V) is applied between the electrodes, $K_{11}$ is obtained from the electrostatic capacity (C) of the cell filled with the liquid crystal composition. In a liquid crystal cell in a state in which a voltage is not applied between the electrodes, liquid crystal molecules are vertically aligned. It is known that Equation (3) is established in the case of considering the fact that, in the case where a director tilt angle (φ) of the vertically aligned liquid crystal molecules with respect to the substrate is set to 0, and a high voltage (V) is applied between the electrodes, a director tilt angle (φm) of the liquid crystal molecules in the center of the cell in a thickness direction approaches π/2 rad, and in the case where the electrostatic capacity of the cell filled with the liquid crystal composition at the time of applying a voltage that is sufficiently lower than the threshold voltage (Vth) in particular is designated as $C_{//}$. Here, a and γ in Equation (3) are respectively represented by Equations (31) and (33), and κ in Equation (31) is represented by Equation (32). Here, the "voltage that is sufficiently lower than the threshold voltage" is as described above.

[Math. 3]

$$\frac{C - C_{//}}{C_{//}} = \gamma \cdot \left\{ 1 - a \cdot \frac{Vth}{V} \right\} \quad (3)$$

$$a = \frac{2}{\pi} \cdot (1 + \gamma)^{\frac{1}{2}} \cdot \int_0^1 \left\{ \frac{(1 + \kappa \cdot x^2)}{(1 + \gamma \cdot x^2)} \right\}^{\frac{1}{2}} dx \quad (31)$$

$$\kappa = \frac{K_{11}}{K_{33}} - 1 \quad (32)$$

$$\gamma = \frac{\varepsilon_\perp}{\varepsilon_{//}} - 1 \quad (33)$$

Here, a and γ are constants, and, as has become clear in Equation (3), a linear relationship is established between these variables in the case of plotting on a graph by setting "$(C-C_{//})/C_{//}$" as the vertical axis and "Vth/V" as the horizontal axis. Then, by changing the applied voltage (V) and measuring the electrostatic capacity (C) and by plotting the actual "$(C-C_{//})/C_{//}$" and "Vth/V" on a graph, a linear slope (that is, a rate of an amount of change of "$(C-C_{//})/C_{//}$" with respect to an amount of change of "Vth/V") can be obtained. Since the value of the slope thus obtained becomes equal to "a·γ" in Equation (3), a is obtained, κ is further obtained from Equation (31), and $K_{11}$ is obtained from Equation (32).

<Chiral Compounds>

The chiral compound may be a known chiral compound, and, for example, may be any one of a compound having an asymmetric atom, a compound having axial asymmetry, a compound having plane asymmetry, and an atropisomer, however, a compound having an asymmetric atom or a compound having axial asymmetry is preferable. In the compound having an asymmetric atom, the asymmetric atom is preferably an asymmetric carbon atom, since an asymmetric carbon atom makes stereoinversion difficult to occur, and a heteroatom may also serve as an asymmetric atom. The asymmetric atom may be introduced into a part of a chain structure, or may be introduced into a part of a ring structure. In the case where a helix-inducing force is required to be particularly strong, a compound having axial asymmetry is preferable.

The chiral compound may or may not have a polymerizable group.

One kind of the chiral compound may be used alone, or two or more kinds thereof may be used in combination.

Examples of the compound having an asymmetric atom, include a compound having an asymmetric carbon in a side chain moiety a compound having an asymmetric carbon in a ring structure moiety, and a compound satisfying both of these cases. Specifically, Examples of the compound having an asymmetric atom include a compound represented by General Formula (Ch-I).

[Chem. 1]

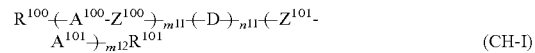

(CH-I)

In General Formula (Ch-I), $R^{100}$ and $R^{101}$ each independently represent a hydrogen atom, a cyano group, $NO_2$, halogen, OCN, SCN, $SF_5$, a chiral or achiral alkyl group having 1 to 30 carbon atoms, and a chiral group having a polymerizable group or a ring structure; one or two or more $CH_2$ groups that are not adjacent to each other in the alkyl group may each independently be substituted with —O—, —S—, —NH—, —N($CH_3$)—, —CO—, —COO—, —OCO—, —OCO—O—, —S—CO—, —CO—S—, —CH=CH—, —$CF_2$—, —CF=CH—, —CH=CF—, —CF=CF—, or C≡C—; one or two or more hydrogen atoms in the alkyl group may each independently be substituted with halogen or a cyano group; and the alkyl group may be linear or branched or may have a ring structure.

As the chiral alkyl group substituted with a $CH_2$ group, Formulas (Ra) to (Rk) are preferable.

[Chem. 2]

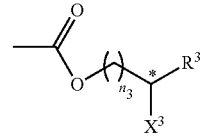

(Ra)

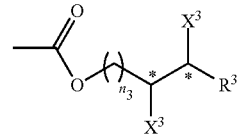

(Rb)

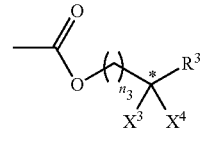

(Rc)

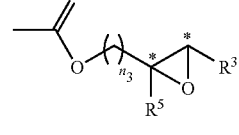

(Rd)

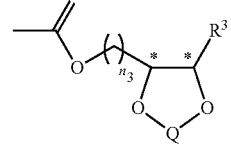

(Re)

[Chem. 3]

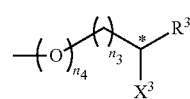

(Rf)

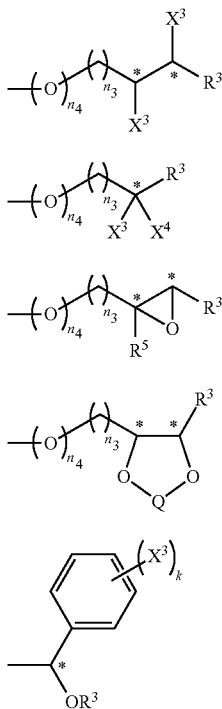

(Rg)

(Rh)

(Ri)

(Rj)

(Rk)

In the formulas, $R^3$ and $R^5$ each independently represent a linear or branched alkyl group having 1 to 10 carbon atoms or a hydrogen atom; one or two or more —$CH_2$— groups in the alkyl group may be substituted with a group in which oxygen atoms or sulfur atoms are not directly bonded to each other, such as —O—, —S—, —NH—, —N($CH_3$)—, —CO—, —CO—O—, —O—CO—, —O—CO—O—, —S—CO—, —CO—S—, —O—$SO_2$—, —$SO_2$—O—, —CH=CH—, —C≡C—, a cyclopropylene group, or —Si($CH_3$)$_2$—; one or more hydrogen atoms in the alkyl group may be further substituted with a fluorine atom, a chlorine atom, a bromine atom, or a cyano group; and the alkyl group may have a polymerizable group. As the polymerizable group, structures represented by Formulas (R-1) to (R-15) are preferable.

[Chem. 4]

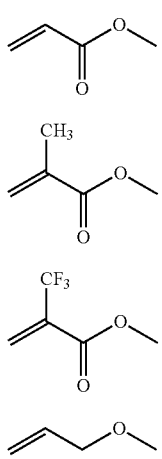

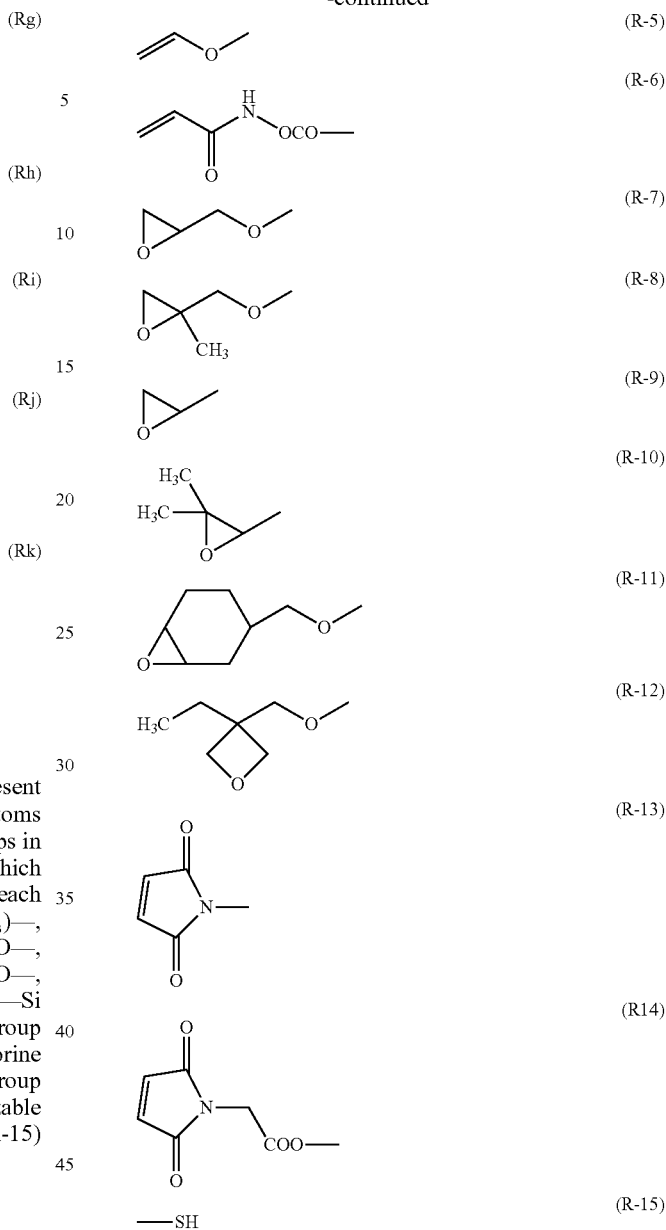

$X^3$ and $X^4$ are preferably a halogen atom (F, Cl, Br, or I), a cyano group, a phenyl group (any one or two or more hydrogen atoms in the phenyl group may be substituted with a halogen atom (F, Cl, Br, or I), a methyl group, a methoxy group, —$CF_3$, or —$OCF_3$), a methyl group, a methoxy group, —$CF_3$, or —$OCF_3$. Here, in order for the positions indicated by asterisks * in General Formulas (Rc) and (Rh) to be asymmetric atoms, different groups are selected as $X^4$ and $X^3$.

Furthermore, $n_3$ is an integer of 0 to 20, and $n_4$ is 0 or 1, in General Formulas (Rd) and (Ri), $R^5$ is preferably a hydrogen atom or a methyl group, in General Formulas (Re) and (Rj), examples of Q include a divalent hydrocarbon group such as a methylene group, an isopropylidene group, and a cyclohexylidene group, in General Formula (Rk), k is an integer of 0 to 5, and R preferably represents a linear or branched alkyl group having 4 to 8 carbon atoms such as $C_4H_9$, $C_6H_{13}$, and $C_8H_{17}$. In addition, $X^3$ is preferably F, $CF_3$, or $CH_3$.

Among these, as the chiral alkyl group substituted with a CH$_2$ group,

[Chem. 5]

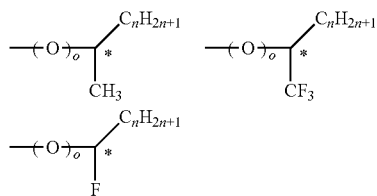

are particularly preferable (in the formulas, o is 0 or 1; n is an integer of 2 to 12, preferably 3 to 8, and more preferably 4, 5, or 6; and the asterisks * represent chiral carbon atoms).

In General formula (Ch-I), $Z^{100}$ and $Z^{101}$ each independently represent —O—, —S—, —CO—, —COO—, —OCO—, —O—COO—, —CO—N(R$^a$)—, —N(R$^a$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CF$_2$CF$_2$—, —CH=CH—, —CF=CH—, —CH=CF—, —CF=CF—, —C≡C—, —CH=CH—COO—, —OCO—CH=CH—, or a single bond; and R$^a$ in —CO—N(R$^a$)— or —N(R$^a$)—CO— represents a hydrogen atom or a linear or branched alkyl group having 1 to 4 carbon atoms, and preferably represent —CF$_2$O—, —OCF$_2$—, —CF$_2$CF$_2$—, —CF=CF—, —COO—, —OCO—, —CH$_2$—CH$_2$—, —C≡C—, or a single bond.

In General Formula (Ch-I), $A^{100}$ and $A^{101}$ each independently represent (a) a trans-1,4-cyclohexylene group (one —CH$_2$— or two or more —CH$_2$—'s that are not adjacent to each other present in the group may each independently be substituted with —O— or —S—), (b) a 1,4-phenylene group (one —CH= or two or more —CH='s that are not adjacent to each other present in the group may be substituted with a nitrogen atom), or (c) a group selected from the group consisting of a 1,4-cyclohexylene group, a 1,4-bicyclo[2.2.2]octylene group, indane-2,5-diyl, a naphthalene-2,6-diyl group, a decahydronaphthalene-2,6-diyl group, and a 1,2,3,4-tetrahydronaphthalene-2,6-diyl group (one —CH$_2$— or two or more —CH$_2$—'s that are not adjacent to each other present in the groups of group (c) may each independently be substituted with —O— or and —S—, and one —CH= or two or more —CH='s that are not adjacent to each other present in the groups of the group (c) may be substituted with a nitrogen atom). All of these groups may be unsubstituted, or may be monosubstituted or polysubstituted with halogen, a cyano group, NO$_2$, or an alkyl, alkoxy, alkylcarbonyl, or alkoxycarbonyl group having 1 to 7 carbon atoms, in which one or two or more hydrogen atoms may be substituted with F or Cl.

$A^{100}$ and $A^{101}$ preferably represent 1,4-phenylene or trans-1,4-cyclohexylene, and these rings are preferably unsubstituted or substituted with F, Cl, CN, or alkyl, alkoxy, alkylcarbonyl, or alkoxycarbonyl having 1 to 4 carbon atoms at positions 1 to 4.

In General Formula (Ch-I), $n^{11}$ represents 0 or 1; when $n^{11}$ is 0, $m^{12}$ is 0, and $m^{11}$ is 0, 1, 2, 3, 4 or 5; when $n^{11}$ is 1, $m^{11}$ and $m^{12}$ each independently are 0, 1, 2, 3, 4, or 5; and when $n^{11}$ is 0, at least one of $R^{100}$ and $R^{101}$ is a chiral alkyl group, a polymerizable group, or a chiral group having a ring structure.

When $n^{11}$ and $m^{12}$ are 0, $m^{11}$ are preferably 1, 2, or 3; and when $n^{11}$ is 1, $m^{11}$ and $m^{12}$ each independently preferably represent 1, 2, or 3.

In General Formula (Ch-I), D is a substituent represented by any one of Formulas (D1) to (D3).

[Chem. 6]

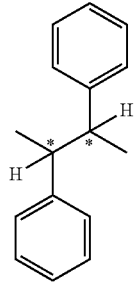

(D1)

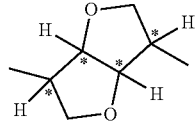

(D2)

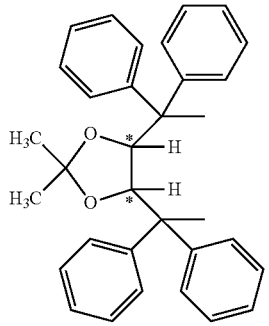

(D3)

(In the formulas, any one or two or more hydrogen atoms in the benzene ring may be substituted with a halogen atom (F, Cl, Br, or I), an alkyl group or an alkoxy group having 1 to 20 carbon atoms, provided that any hydrogen atom in the alkyl group or the alkoxy group may be substituted with a fluorine atom; and an arbitrary methylene group in the alkyl group or the alkoxy group may be substituted with —O—, —S—, —COO—, —OCO—, —CF$_2$—, —CF=CH—, —CH=CF—, —CF=CF—, or C≡C— as long as the same atoms in terms of an oxygen atom or a sulfur atom are not directly bonded to each other.)

In the case where $n^{11}$ in -(A$^{100}$-Z$^{100}$)m$^{11}$-(D)n$^{11}$-(Z$^{101}$-A$^{101}$)m$^{12}$-, which is a partial structure in General Formula (Ch-I), is 0, the partial structure is preferably any one of the following structures.

[Chem. 7]

(IV-b1)

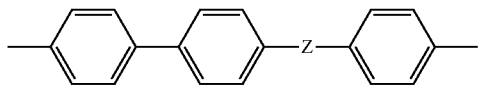
(IV-b2)

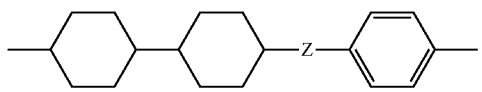
(IV-b3)

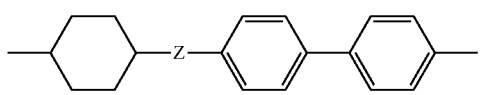
(IV-b4)

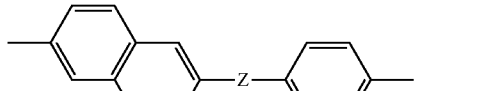
(IV-b5)

(IV-b6)

(IV-b7)

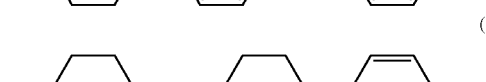
(IV-b8)

[Chem. 8]

(IV-b9)

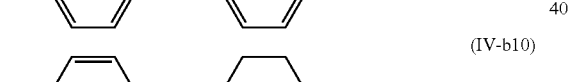
(IV-b10)

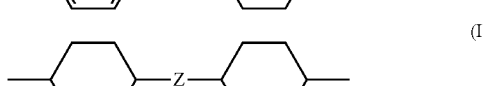
(IV-b11)

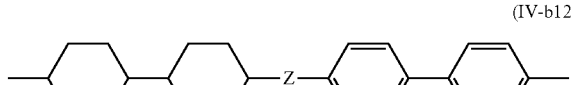
(IV-b12)

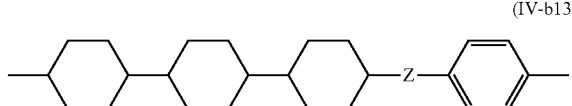
(IV-b13)

(Here, in these formulas, any one or two or more hydrogen atoms in the benzene ring may be substituted with a halogen atom (F, Cl, Br, or I), a methyl group, a methoxy group, —CF$_3$, or —OCF$_3$, any one or two or more carbon atoms in the benzene ring may be substituted with a nitrogen atom, and the introduction of these substituent and a nitrogen atom is preferable, since the introduction thereof controls degradation in crystallinity and direction and size of dielectric anisotropy; and Z has the same definition as those of Z$^{100}$ and Z$^{101}$ in Formula (Ch-I)). In terms of reliability, a benzene ring or a cyclohexane ring is preferred over a hetero ring such as a pyridine ring and a pyrimidine ring. In terms of increasing dielectric anisotropy, a compound having a hetero ring such as a pyridine ring and a pyrimidine ring may be used, and in this case, polarizability of the compound is comparatively great, and crystallinity is decreased, whereby liquid crystallinity is stabilized, which is preferable. In the case of a hydrocarbon ring such as a benzene ring and a cyclohexane ring, the polarizability of the compound is low. Therefore, it is preferable to select an appropriate content in accordance with the polarizability of a chiral compound.

When n$^{11}$ and m$^{12}$ are 0, preferable forms of the compound represented by General Formula (Ch-I) are as follows.

[Chem. 9]

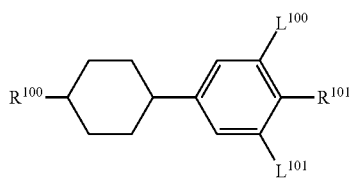
(Ch-I-1)

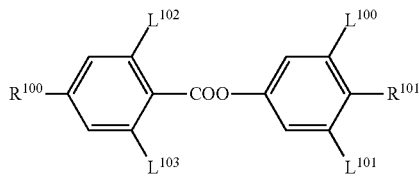
(Ch-I-2)

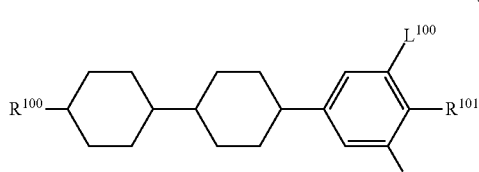
(Ch-I-3)

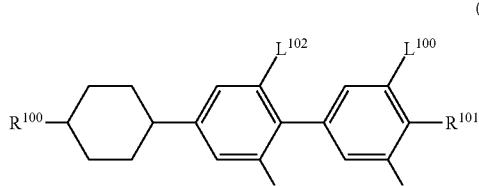
(Ch-I-4)

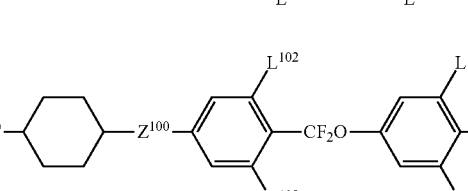
(Ch-I-5)

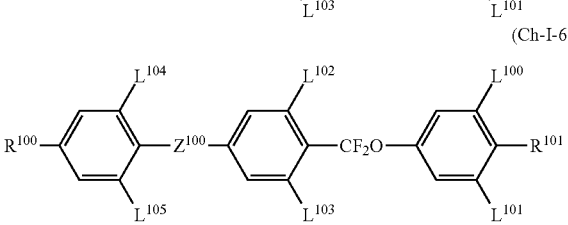
(Ch-I-6)

(Ch-I-7)
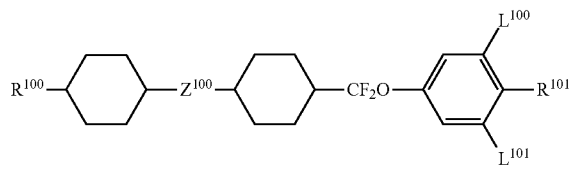
(Ch-I-8)
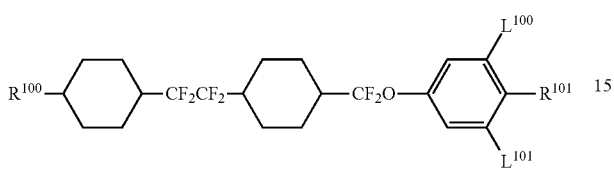
[Chem. 10]
(Ch-I-9)
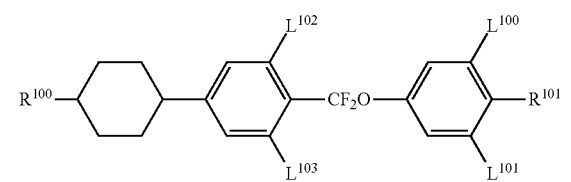
(Ch-I-10)
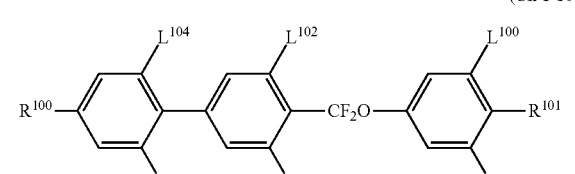
(Ch-I-11)
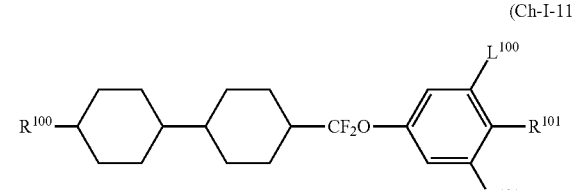
(Ch-I-12)
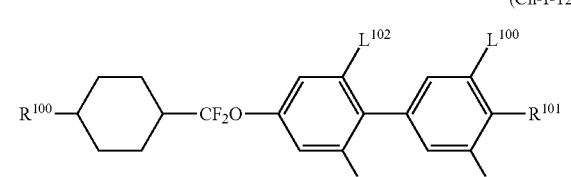
(Ch-I-13)
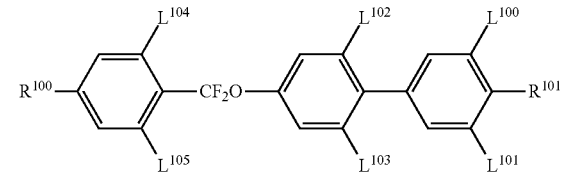
(Ch-I-14)
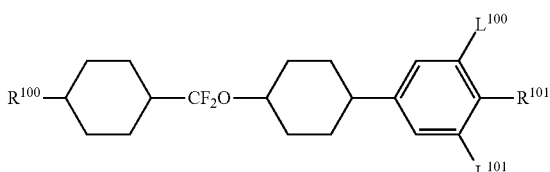
[Chem. 11]
(Ch-I-15)
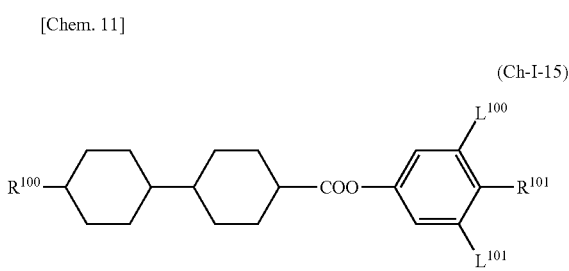
(Ch-I-16)
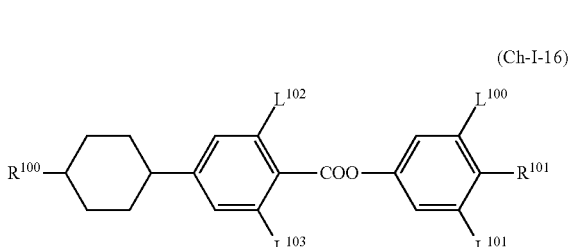
(Ch-I-17)
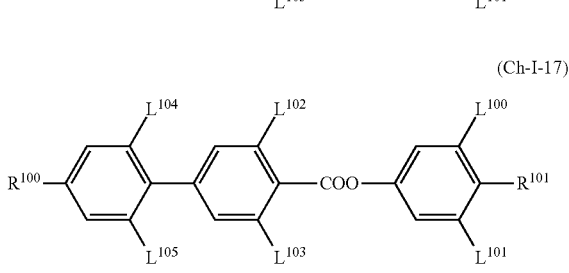
(Ch-I-18)
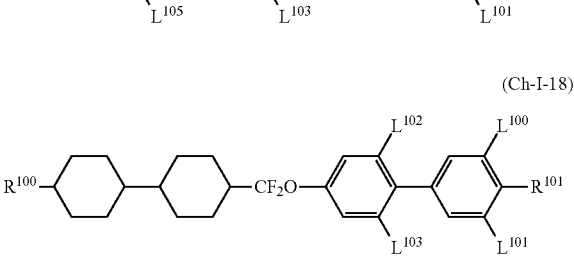
(Ch-I-19)
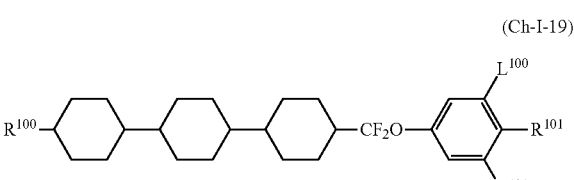
(Ch-I-20)
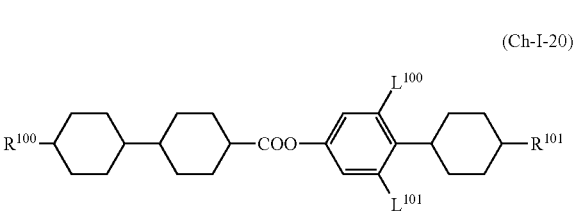

-continued (Ch-I-21)
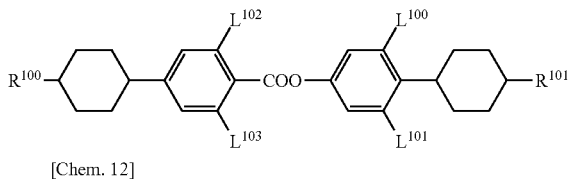

[Chem. 12]

(Ch-I-22)
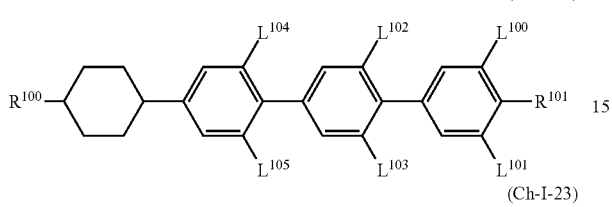

(Ch-I-23)
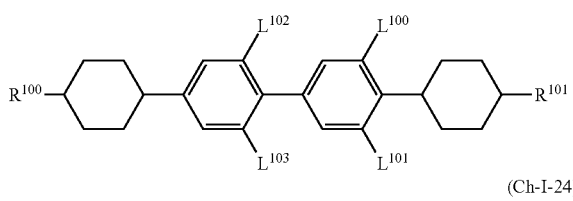

(Ch-I-24)
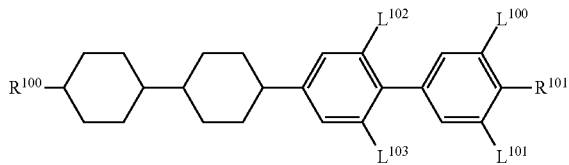

[Chem. 13]

(Ch-I-25)
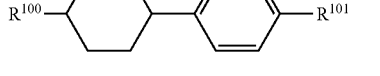

(Ch-I-26)
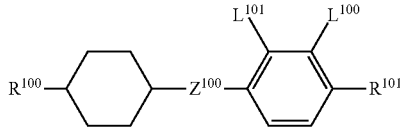

-continued (Ch-I-27)
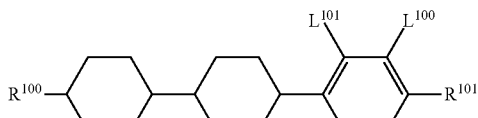

(Ch-I-28)

(Ch-I-29)
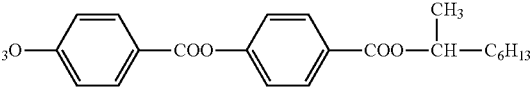

In the formulas, $R^{100}$, $R^{101}$, and $Z^{100}$ have the same meaning as those of $R^{100}$, $R^{101}$ and $Z^{100}$ in General Formula (Ch-I), at least one of $R^{100}$ and $R^{101}$ represents a chiral group, and $L^{100}$ to $L^{105}$ each independently represent a hydrogen atom or a fluorine atom.

Among these, the compound represented by General Formula (Ch-I) is preferably a compound represented by the following formula.

[Chem. 14]

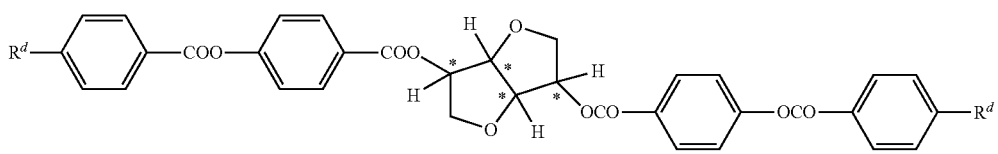

When $n^{11}$ represents 1, the compound represented by General Formula (CH-I) has a structure in which the ring structure moiety includes an asymmetric carbon, and the chiral structure D is preferably Formula (D2).

Examples of the compound represented by General Formula (Ch-I) where D represents Formula (D2) include Formulas (D2-1) to (D2-8).

[Chem. 15]

(2D-1)
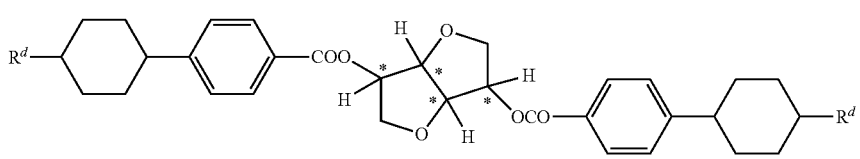

(2D-2)

-continued (2D-3)
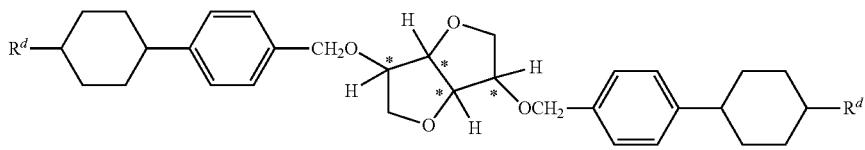

(2D-4)
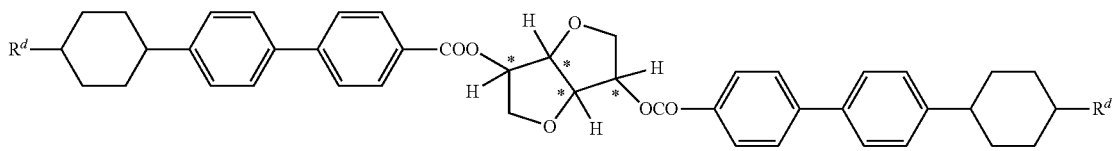

[Chem. 16]

(2D-5)
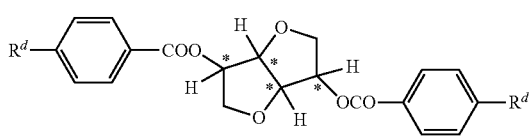

(2D-6)
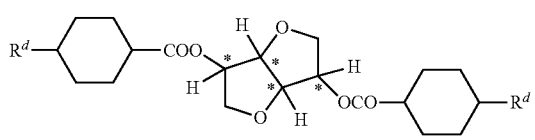

(2D-7)
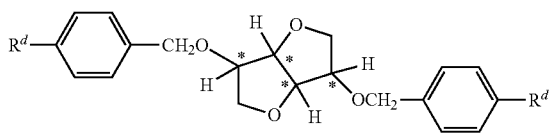

(2D-8)
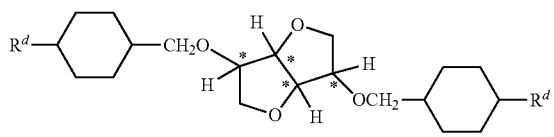

As the axially asymmetric compound, compounds represented by General Formulas (IV-d4), (IV-d5), (IV-c1), and (IV-c2) are preferable. Here, in the case of General Formulas (IV-d4), (IV-d5), and (IV-c2), the axis of the axial asymmetry is a bond that connects the α positions of two naphthalene rings, and in the case of General Formula (IV-c1), the axis is a single bond that connects two benzene rings.

[Chem. 17]

(IV-d4)
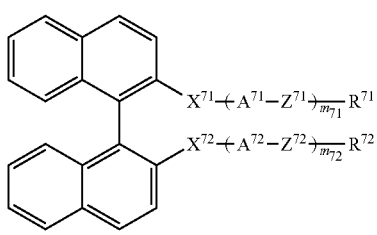

(IV-d5)
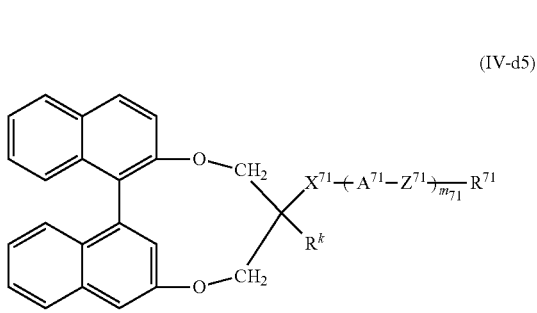

[Chem. 18]

(IV-c1)
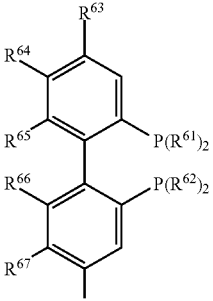

(IV-c2)
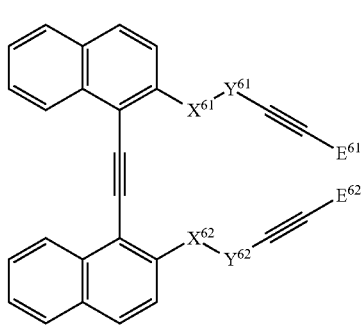

In General Formulas (IV-d4) and (IV-d5), $R^{71}$ and $R^{72}$ each independently represent a hydrogen atom, a halogen atom, a cyano (CN) group, an isocyanate (NCO) group, an isothiocynanate (NCS) group, or an alkyl group having 1 to 20 carbon atoms. Any one or two or more —$CH_2$—'s in the alkyl group may be substituted with —O—, —S—, —COO—, —OCO—, —CH=CH—, —CF=CF—, or —C≡C—, and any hydrogen in the alkyl may be substituted with a halogen atom.

In General Formulas (IV-d4) and (IV-d5), $A^{71}$ and $A^{72}$ each independently represent a 3- or 6- to 8-membered aromatic or non-aromatic ring or a fused ring having 9 or more carbon atoms. Any hydrogen atom in these rings may be substituted with a halogen atom or an alkyl group or a haloalkyl group having 1 to 3 carbon atoms, one or two or more —$CH_2$—'s in the rings may be substituted with —O—, —S—, or —NH—, and one or two or more —CH=—'s in the rings may be substituted with —N=.

In General Formulas (IV-d4) and (XV-d5), $Z^{71}$ and $Z^{72}$ each independently represent a single bond or an alkylene group having 1 to 8 carbon atoms. Any —$CH_2$— may be substituted with —O—, —S—, —COO—, —OCO—, —CSO—, —OCS—, —N=N—, —CH=N—, —N=CH—, —N(O)=N—, —N=N(O)—, —CH=CH—, —CF=CF—, or —C≡C—, and any hydrogen atom may be substituted with a halogen atom.

In General Formulas (IV-d4) and (XV-d5), $X^{71}$ and $X^{72}$ each independently represent a single bond, —COO—, —OCO—, —$CH_2$O—, —O$CH_2$—, —$CF_2$O—, —O$CF_2$—, or —$CH_2CH_2$—.

In General Formulas (IV-d4) and (IV-d5), $m_{71}$ and $m_{72}$ each independently represent an integer of 1 to 4. Here, any one of $m_{71}$ and $m_{72}$ in General Formula (IV-d5) may be 0.

$R^k$ represents a hydrogen atom, a halogen atom, or $X^{71}$-($A^{71}$-$Z^{71}$)—$R^{71}$.

At least any one of $X^{61}$ and $Y^{61}$ and at least any one of $X^{62}$ and $Y^{62}$ are present in General Formulas (IV-c1) and (IV-c2), respectively, and $X^{61}$, $X^{62}$, $Y^{61}$, and $Y^{62}$ each independently represent any one of $CH_2$, C=O, O, M, S, P, B, and Si. In addition, in the case where $X^{61}$, $X^{62}$, $Y^{61}$, and $Y^{62}$ each independently represent any one of N, P, B, or Si, may be bonded to a substituent such as an alkyl group, an alkoxy group, and an acyl group, so as to satisfy a required valence.

In General Formulas (IV-c1) and (IV-c2), $E^{61}$ and $E^{62}$ each independently represent any one of a hydrogen atom, an alkyl group, an aryl group, an allyl group, a benzyl group, an alkenyl group, an alkynyl group, an alkyl ether group, an alkyl ester group, an alkyl ketone group, a hetero ring group, and a derivative thereof.

In General Formulas (IV-c1) and (IV-c2), $R^{61}$ and $R^{62}$ each independently represent an alkyl group, an alkoxyl group, a phenyl group which may be substituted with a halogen atom, a cyclopentyl group which may be substituted with a halogen atom, or a cyclohexyl group which may for substituted with a halogen atom.

In General Formula (IV-c1), $R^{63}$, $R^{64}$, $R^{65}$, $R^{66}$, $R^{67}$, and $R^{68}$ each independently represent a hydrogen atom, an alkyl group, an alkoxyl group, an acyloxy group, a halogen atom, a haloalkyl group, or a dialkylamino group. Two of $R^{63}$, $R^{64}$, and $R^{65}$ may form a methylene chain which may have a substituent, and two of $R^{63}$, $R^{64}$, and $R^{65}$ may form a mono or polymethylenedioxy group which may have a substituent or substituent. Two of $R^{66}$, $R^{67}$, and $R^{68}$ may form a methylene chain which may have a substituent, and two of $R^{66}$, $R^{67}$, and $R^{68}$ may form a mono or polymethylenedioxy group which may have a substituent or substituent. Here, the case where both $R^{65}$ and $R^{66}$ are hydrogen atoms is excluded.

In the case where strong helical twisting power is particularly required, compounds represented by General Formulas (IV-d4) and (IV-d5) are particularly preferable.

The helical pitch ($P_0$) of the liquid crystal composition becomes smaller as a concentration of a chiral compound in the liquid crystal composition becomes higher, however, it is known, that, in the case where the concentration, of the chiral compound in the liquid crystal composition is low, the product of the concentration of the chiral compound (c (% by mass)) and the helical pitch ($P_0$ (μm)) is constant, and using the reciprocal thereof, helical twisting power (HTP (μm$^{-1}$)) represented by Equation (4) is defined. The helical twisting power (HTP) represents a magnitude of the power that subjects the liquid crystal composition including the chiral compound to twist, alignment (helical twisting power).

$$HTP=1/(P_0 \times 0.01c) \quad (4)$$

The helical twisting power (HTP) of the chiral compound in the present invention is preferably s 1.0 to 100.0 μm$^{-1}$, more preferably 2.0 to 70.0 μm$^{-1}$, and particularly preferably 3.0 to 20.0 μm$^{-1}$.

By setting the helical twisting power (HTP) of the chiral compound equal to or greater than the lower limit value, the physical properties of the liquid crystal composition are not affected by the content of the chiral compound, and sufficient, twist, alignment power is obtained. By setting the helical twisting power (HTP) of the chiral compound to be equal to or lower than the upper limit, value, sufficient, twist, alignment power is obtained for the liquid crystal composition, even with a small content, of the chiral compound.

In general, the higher the content of the chiral compound in the liquid crystal composition to be measured is, the lower the threshold voltage (Vth) becomes. In consideration of such effect, the content of the chiral compound in the liquid crystal composition to be measured is preferably 0.0001% by mass or more, more preferably 0.0005% by mass or more, even more preferably 0.001% by mass or more, still more preferably 0.0025% by mass or more, still more preferably 0.005% by mass or more, still more preferably 0.0075% by mass or more, still more preferably 0.01% by mass or more, still more preferably 0.025% by mass or more, still more preferably 0.05% by mass or more, and still more preferably 0.075% by mass or more. Furthermore, the content of the chiral compound in the liquid crystal composition to be measured is preferably 10% by mass or less, more preferably 7.5% by mass or less, even more preferably 5% by mass or less, still more preferably 3.5% by mass or less, still more preferably 2% by mass or less, still more preferably 1% by mass or less, still more preferably 0.8% by mass or less, still more preferably 0.6% by mass or less, and still more preferably 0.4% by mass or less.

The liquid crystal composition serving as the object for measuring $K_{22}$ in the present invention is an n-type liquid crystal composition whose dielectric anisotropy (Δε) is less than −1.5 and which generally does not include a polymerizable compound.

The liquid crystal composition used in the liquid crystal display element of the present invention is also an n-type liquid crystal composition whose dielectric anisotropy (As) is less than −1.5, and the liquid crystal composition is preferably designed using the method for measuring an elastic constant and the elastic constant measurement device for the liquid crystal composition.

Examples of the liquid crystal composition used in the liquid crystal display element of the present invention include the same composition as the n-type liquid crystal composition to which the method for measuring an elastic constant of the liquid crystal composition is applied.

The liquid crystal composition used in the liquid crystal display element of the present invention may be an n-type liquid crystal composition prepared by further incorporating a polymerizable compound to an n-type liquid crystal composition which is an object for applying the method for measuring an elastic constant.

In the liquid crystal composition used in the liquid crystal display element of the present invention, the $\Gamma$ value obtained from Equation (2) defined by using $K_{11}$, $K_{22}$, and $K_{33}$ is 0.3 or less. This implies that, in order to improve light transmittance of the liquid crystal composition, not only the value of $K_{22}$ (absolute value) should be simply decreased, but also the value of $K_{22}$ should be relatively small with respect to the values of $K_{11}$ and $K_{33}$. The $\Gamma$ value being 0.3 or less will be specified in Examples described below.

In general, as the $\Gamma$ value of the liquid crystal composition becomes smaller, the light transmittance tends to be improved, and the driving voltage ($V_{100}$ voltage) tends to be lowered. On the contrary, as the $\Gamma$ value becomes greater, the light transmittance tends to be lowered, and the driving voltage ($V_{100}$ voltage) tends to be increased.

Accordingly, with respect to the liquid crystal composition used in the liquid crystal display element of the present invention, the $\Gamma$ value is preferably 0.01 or more, more preferably 0.05 or more, even more preferably 0.1 or more, and particularly preferably 0.2 or more. By setting the $\Gamma$ value to be equal to or greater than the lower limit value, the driving voltage of the liquid crystal display element is not significantly lowered, and the light transmittance is further improved.

Furthermore, as the $\Gamma$ value of the liquid crystal composition used in the liquid crystal display element of the present invention becomes greater, response time can also foe improved. From the viewpoint of improving the response time, the $\Gamma$ value is preferably 0.01 or more, more preferably 0.05 or more, even more preferably 0.1 or more, and particularly preferably 0.2 or more, similarly to the case of the transmittance.

Meanwhile, the $\Gamma$ value of the liquid crystal composition used in the liquid crystal display element of the present invention may be 0.3 or less. For example, the range of the $\Gamma$ value can be any one of 0.27 or less and 0.25 or less.

By performing simulation using the elastic constants ($K_{11}$, $K_{22}$, and $K_{33}$) characteristic to a liquid crystal composition, whether the composition has the desired characteristic or not can be predicted. Such method is extremely useful in designing a liquid crystal composition.

However, when driving the n-type liquid crystal composition, the magnitude of the force applied on liquid crystal molecules and directions of the molecules vary depending on the position at which the molecules are present in the cell. Furthermore, the size of interaction between adjacent liquid crystal molecules and directions of the molecules vary. Therefore, in the case where only some of the elastic constants ($K_{11}$, $K_{22}$, and $K_{33}$) are considered, or an elastic constant (particularly $K_{22}$) with a large error is used, the characteristics of the liquid crystal composition cannot be predicted with high accuracy. From this viewpoint, methods of the related art were inadequate.

On the other hand, the liquid crystal composition used in the liquid crystal display element of the present invention is designed based: on highly accurate elastic constants including $K_{22}$, the predicted characteristics are highly accurate, and design accuracy is extremely high. Thus, the design accuracy of the liquid crystal display element of the present invention obtained using such liquid crystal composition is also extremely high.

Hereinafter, a preferred embodiment of the liquid crystal display element of the present invention will be more specifically described.

The liquid crystal display element of the present invention is obtained using the liquid crystal composition, and examples thereof include a VA type liquid crystal display element including a cell that is the same as the cell shown in FIG. 1.

Figure 3:
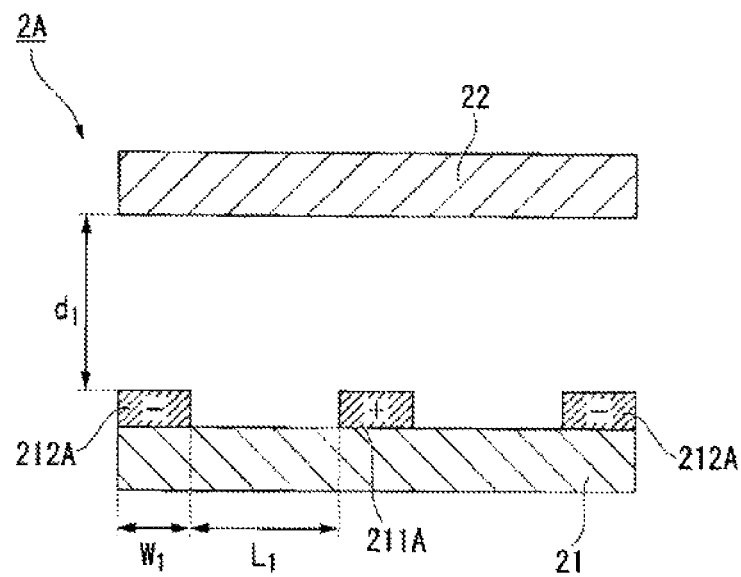
FIG. 3 is a cross-sectional view schematically showing main parts of one embodiment of a cell used in a liquid crystal display element of the present invention.
Figure 4:
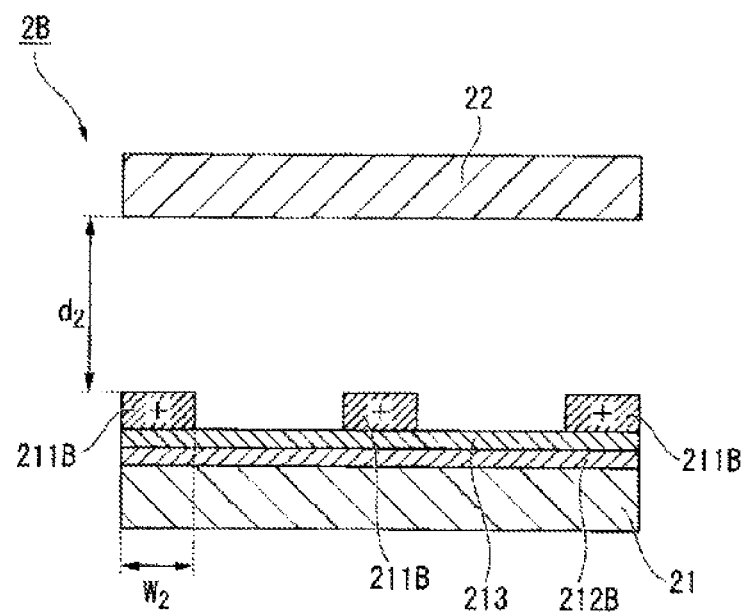
FIG. 4 is a cross-sectional view schematically showing main parts of another embodiment of the cell used in the liquid crystal display element of the present invention.

The examples of the liquid crystal display element of the present invention also include an in-plane switching (IPS) type or a fringe field switching (FFS) type liquid crystal display element including the cell shown in FIG. 3 or 4.

The liquid crystal display element of the present invention can have the same configuration as that of a known liquid crystal display element, except for including the liquid crystal composition as a liquid crystal composition.

First, the cells shown in FIGS. 3 and 4 will be described in detail.

FIG. 3 is a cross-sectional view schematically showing main parts of one embodiment of the cell used in the liquid crystal display element of the present invention.

A cell 2A shown here includes a pair of substrates: a first substrate 21 and a second substrate 22. A first electrode 211A and a second electrode 212A are alternately disposed on the surface of the first substrate 21 that opposes (faces) the second substrate 22. Here, the case where the first electrode 211A is an anode and the second electrode 212A is a cathode is shown. In the cell 2A, the liquid crystal composition is interposed between the first substrate 21 and the second substrate 22.

A cell gap $d_1$, an electrode width $W_1$ of the first electrode 211A and the second electrode 212A, and a distance $L_1$ between the first electrode 211A and the second electrode 212A in the cell 2A satisfy the conditions of $L_1/d_1>1$ and $L_1/W_1>1$. The distance $L_1$ between the electrodes is greater than the cell gap $d_1$ and the electrode width $W_1$, and the cell does not have a structure in which the first electrode 211A and the second electrode 212A are close to each other. The cell has an electrode configuration used in an IPS type liquid crystal display element.

FIG. 4 is a cross-sectional view, schematically showing main parts of another embodiment of the cell used in the liquid crystal display element of the present invention. Among the constitutional elements shown in FIG. 4, the same constitutional elements shown in FIG. 3 are given the same reference signs as in the case of FIG. 3, and detailed description thereof will be omitted.

A cell 2B shown here includes the pair of substrates: the first substrate 21 and the second substrate 22. A second electrode 212B and an insulation layer 213 are laminated in this order on the surface of the first substrate 21 that opposes the second substrate 22 toward the second substrate 22 side. In addition, a plurality of first electrodes 211B are disposed at a predetermined interval on the surface of the insulation layer 213 that opposes the second substrate 22. Here, the case where the first electrode 211B is an anode, and the second electrode 212B is a cathode is shown. In the cell 2B, the liquid crystal composition is interposed between the first substrate 21 and the second substrate 22.

In the cell 2B, a cell gap $d_2$ and an electrode width $W_2$ of the first electrode 211B can have, for example, the same definitions as those of $d_1$ and $W_1$ in the cell 2A, respectively. Since in the cell 2B, the distance $L_1$ between the electrodes in the cell 2A becomes 0 (zero), the cell 2B has a structure in which the first electrode 211B and the second electrode 212B are laminated by sandwiching the insulation layer 213 therebetween and has an electrode configuration used in an FFS type liquid crystal display element.

In particular, in the cell 2B which is an FFS type, an electric field is generated in a direction parallel to the surfaces of the first substrate 21 and the second substrate 22 (horizontal direction), as well as in a direction vertical to the surfaces of the first substrate 21 and the second substrate 22 (longitudinal direction). Specifically, a strong electric field is generated in the longitudinal direction, in a region near the side surface of the first electrode 211B. In this case, in addition to the liquid crystal molecules located between the electrodes (between the first electrode 211B and the second electrode 212B), the liquid crystal molecules located on the electrodes (on the first electrode 211B and on the second electrode 212B) are also more strongly driven, unlike in the cell used in an IPS type liquid crystal display element. Therefore, in the cell 2B, by using transparent electrodes as the first electrode 211B and the second electrode 212B, respectively, a display function can be manifested in these electrode portions as well. In a liquid crystal display element including such cell, numerical aperture can be increased.

The cells shown in FIGS. 1, 3, and 4 are merely examples of a part of a cell that can be used in the liquid crystal display element of the present invention, and a cell that can be used in the liquid crystal display element is not limited thereto. For example, the cells shown in FIGS. 1, 3, and 4 can be used by being modified in various ways.

Figure 5:
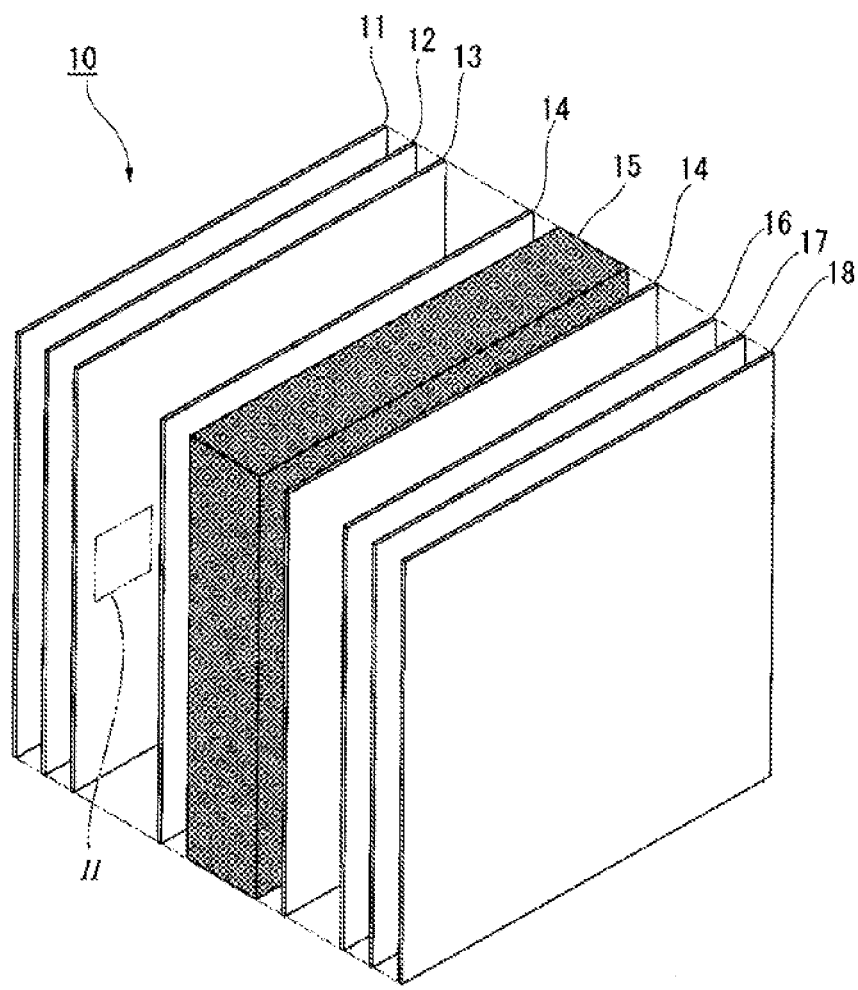
FIG. 5 is a schematic view showing one embodiment of the liquid crystal display element of the present invention.

FIG. 5 is a schematic view showing one embodiment of the liquid crystal display element of the present invention. Note that in FIG. 5, each constitutional element is depicted as being separated from each other, for convenience of description. A liquid crystal display element 10 shown here includes a first transparent insulating substrate (hereinafter, may be abbreviated as a "first substrate") 12 having an alignment film 14 formed on the surface thereof, a second transparent insulating substrate (hereinafter, may be abbreviated as a "second substrate") 17 provided to be separated from the first substrate and having the alignment film 14 formed on the surface thereof, a liquid crystal layer 15 that fills the space between the first substrate 12 and the second substrate 17 and abuts against a pair of the alignment films, and an electrode layer 13 having a thin-film transistor as an active element, a common electrode 122, and a pixel electrode 121, between the alignment film 14 and the first substrate 12.

Figure 7:
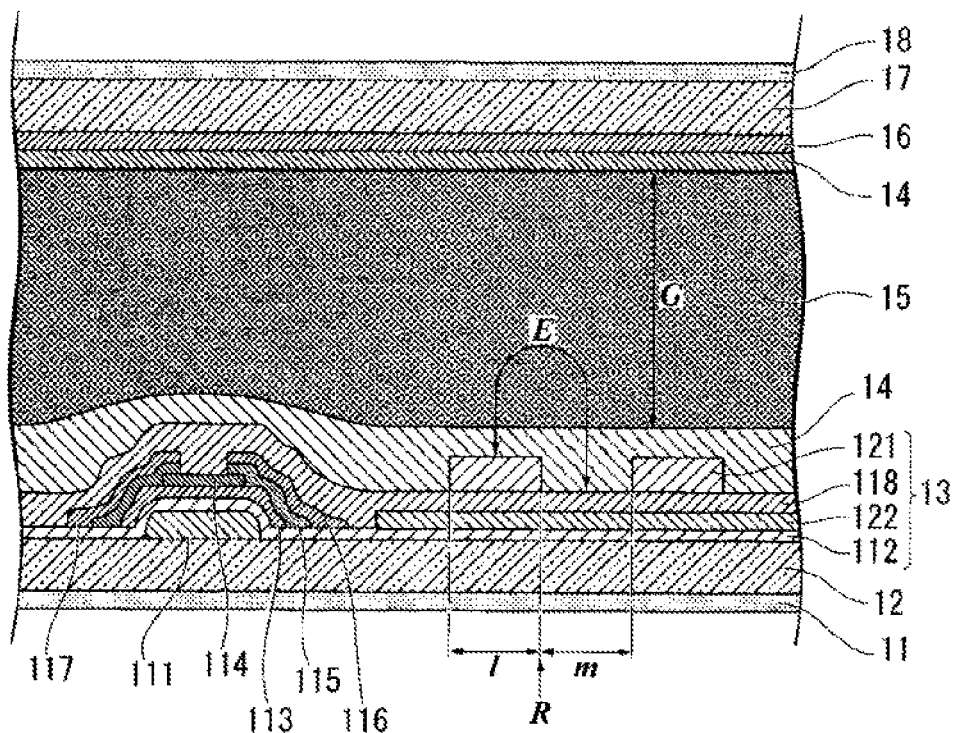
FIG. 7 is a cross-sectional view obtained by cutting the liquid crystal display element shown in FIG. 6.

As shown in FIG. 5, the liquid crystal display element 10 is an in-plane switching system (here, as an example, an FFS type which is one form of an IPS type) liquid crystal display element which includes the first substrate 12 and the second substrate 17 disposed to oppose each other and sandwiches the liquid crystal layer 15 containing the liquid crystal composition therebetween. The electrode layer 13 is formed on the surface of the first substrate 12 on the liquid crystal layer 15 side. In addition, the liquid crystal display element includes the pair of alignment films 14 and 14 which induces homogeneous alignment by directly abutting against the liquid crystal composition constituting the liquid crystal layer 15, between the liquid crystal layer 15 and the first substrate 12 and between the liquid crystal layer 15 and the second substrate 17, respectively. Both of the alignment directions of the alignment films 14 are substantially parallel to the surface of the first substrate 12 or the second substrate 17. That is, liquid crystal molecules in the liquid crystal composition are aligned to be substantially parallel to the surface of the first substrate 12 or the second substrate 17, when voltage is not applied. As shown in FIGS. 5 and 7, the first substrate 12 and the second substrate 17 may be sandwiched between a pair of polarizing plates 11 and 18. Furthermore, as shown in FIGS. 5 and 7, a color filter 16 is provided between the second substrate 17 and the alignment film 14. The liquid crystal display element of the present invention may be a so-called color filter on array (COA), may be provided with a color filter between an electrode layer including a thin-film transistor and a liquid crystal layer, and may be provided with a color filter between the electrode layer including a thin-film transistor and a second substrate.

The liquid crystal display element 10 shown here has a configuration in which the first polarizing plate 11, the first substrate 12, the electrode layer 13 including the thin-film transistor, the alignment film 14, the liquid crystal layer 15 containing the liquid crystal composition, the alignment film 14, the color filter 16, the second substrate 17, and a second polarizing plate 18 are laminated in this order.

As the first substrate 12 and the second substrate 17, substrates formed of glass or a transparent insulating material having flexibility such as plastic can be used, or substrates formed of a non-transparent insulating material such as silicon may be used. The first substrate 12 and the second substrate 17 are bonded together by a sealant such as an epoxy-based thermally curable composition and a sealing material disposed in the peripheral region, and a particulate spacer such as glass particles, plastic particles, and alumina particles or a spacer column formed of a resin formed, by a photolithography method may be: disposed therebetween in order to maintain the distance between the substrates.

Figure 6:
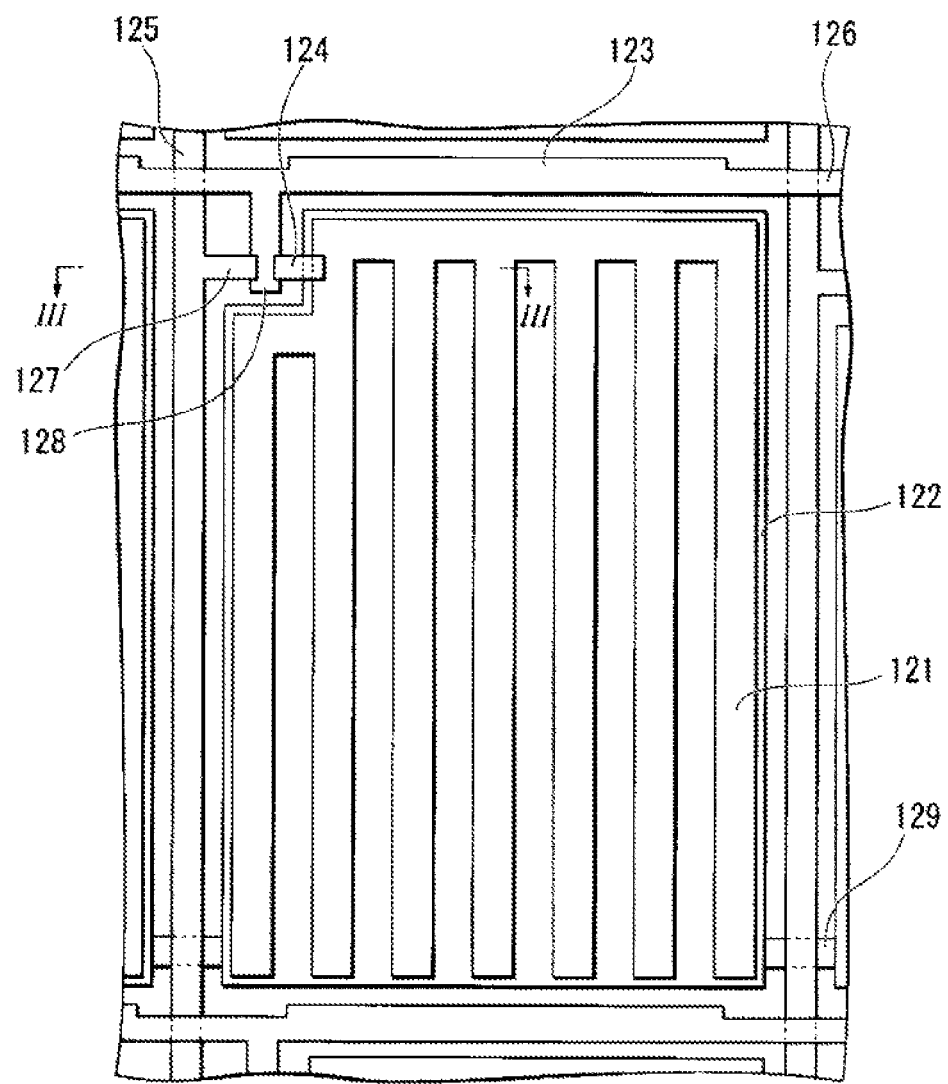
FIG. 6 is an enlarged plan view of the liquid crystal display element shown in FIG. 5.

FIG. 6 is an enlarged plan view of the area surrounded by the line II on the electrode layer 13 formed on the first substrate 12 in FIG. 5. FIG. 7 is a cross-sectional view obtained by cutting the liquid crystal display element shown in FIG. 3 in the direction of the line III-III in FIG. 6. As shown in FIG. 6, in the electrode layer 13 including the thin-film transistor, which is formed on the surface of the first substrate 12, a plurality of gate wirings 124 for supplying a scanning signal and a plurality of data wirings 125 for supplying a display signal are disposed to cross each other in a matrix form. In FIG. 6, only a pair of the gate wirings 124 and a pair of the data wirings 125 are shown.

A unit pixel of the liquid crystal display device is formed by each of the areas surrounded by the plurality of gate wirings 124 and the plurality of data wirings 125, and the pixel electrode 121 and the common electrode 122 are formed in the unit pixel. A thin-film transistor including a source electrode 127, a drain electrode 126, and a gate electrode 128 is provided in the vicinity of the crossing portion of the gate wiring 124 and the data wiring 125. The thin-film transistor is connected to the pixel electrode 121 and drives the pixel electrode 121, serving as a switch element that supplies a display signal to the pixel electrode 121. Furthermore, a common line 129 is provided to be parallel to the gate wiring 124. The common line 129 is connected to the common electrode 122 in order to supply a common signal to the common electrode 122.

As shown in FIG. 7, one preferable aspect of a structure of the thin-film transistor includes a gate electrode 111 which is formed on the surface of the first substrate 12, a gate insulation layer 112 which is provided to cover the gate electrode 111 and to cover substantially the entire surface of the first substrate 12, a semiconductor layer 113 which is formed on the surface of the gate insulation layer 112 so as to oppose the gate electrode 111, a protective layer 114 which is provided to cover a portion of the surface of the semiconductor layer 113, a drain electrode 116 which is provided to cover one side end portions of the protective layer 114 and the semiconductor layer 113 and to contact the gate insulation layer 112 formed on the surface of the first substrate 12, a source electrode 117 which is provided to cover the other side end portions of the protective layer 114 and the semiconductor layer 113 and to contact the gate insulation layer 112 formed on the surface of the first substrate 12, and an insulation protective layer 11S which is provided to cover the drain electrode 116 and the source electrode 117. In the thin-film transistor, an anodic oxide, coating (not shown in the drawing) may be formed on the surface of the gate electrode 111 for the purpose of eliminating a step generated by the gate electrode, and the like.

Although amorphous silicon, polycrystalline polysilicon, and the like can be used as the semiconductor layer 113, it is preferable to use a transparent semiconductor film such as ZnO, In—Ga—Zn—O (IGZO), ITO, and the like, from the viewpoint of preventing adverse effects of a photo-carrier generated by light absorption and increasing numerical aperture of an element.

For the purpose of decreasing a width or a height of a Schottky barrier, an ohmic contact layer 115 may be provided between the semi conductor layer 113 and the drain electrode 116 or the source electrode 117. A material to which an impurity such as phosphorus is added at a high concentration, such as n-type amorphous silicon, n-type polycrystalline polysilicon, and the like can be used as the ohmic contact layer 115.

A gate wiring 126, the data wiring 125, and the common line 129 are preferably, metals, more preferably Al, Cu, An, Ag, Cr, Ta, Ti, Mo, W, Ni, or an alloy thereof, and particularly preferably Al or an alloy thereof. The insulation protective layer 118 is a layer having an insulating function and is formed of silicon nitride, silicon dioxide, or a silicon oxynitride film.

In the embodiment shown in FIGS. 6 and 7, the common electrode 122 is a flat plate-shaped electrode formed on substantially the entire surface on the gate insulation layer 112 (that is, the first, substrate 12), whereas the pixel electrode 121 is a comb-shaped electrode formed on the insulation protective layer 118 which covers the common electrode 122. In other words, the common electrode 122 is more closely disposed to the first substrate 12 than the pixel electrode 121 is, and these electrodes lie on top of each other by sandwiching the insulation protective layer 118 therebetween. The pixel electrode 121 and the common electrode 122 are formed of, for example, a transparent conductive material such as Indium Tin Oxide (ITO), Indium Zinc Oxide (IZO), Indium Zinc Tin Oxide (IZTO), and the like. Since the pixel electrode 121 and the common electrode 122 are formed of the transparent conductive material, the area of opening in a unit, pixel area is increased, and numerical aperture and transmittance increase.

Furthermore, in order to form a fringe electric field between the pixel electrode 121 and the common electrode 122, a distance (minimum separation, distance) R between the pixel electrode 121 and the common electrode 122 is shorter than a distance G between the first substrate 12 and the second substrate 17. Here, the distance R between the electrodes indicates a distance between each electrode in a direction parallel to the surface of the substrate. FIG. 7 shows an example in which the flat plate-shaped common electrode 122 and the cone-shaped pixel electrode 121 lie on top of each other, and thus the distance R between the electrodes is 0, and a fringe electric field E is formed, since the distance (minimum separation distance) R between the electrodes is shorter than the distance G between the first substrate 12 and the second substrate 17 (that is, a cell gap). Therefore, in an FFS type liquid crystal display element, an electric field in a horizontal direction which is formed in a direction vertical to the line that forms the comb shape of the pixel electrode 121 and a parabolic electric field can be used. An electrode width 1 of the comb-shaped portion of the pixel electrode 121 and a gap m in the comb-shaped portion of the pixel electrode 121 are preferably formed to be sufficiently wide to allow all liquid crystal molecules in the liquid crystal layer 15 to be driven by the electric field that is generated. The distance (minimum separation distance) R between the pixel electrode and the common electrode 122 can be adjusted as a (average) film thickness of the gate insulation layer 112. In addition, unlike FIG. 7, the liquid crystal display element of the present invention may be formed such that the distance (minimum separation distance) R between the pixel electrode 121 and the common electrode 122 is longer than the distance G between the first substrate 12 and the second substrate 17 (corresponding to an IPS type). Such liquid crystal display element has, for example, a configuration in which a comb-shaped pixel electrode and a comb-shaped common electrode are alternately provided substantially in the same plane.

The liquid crystal display element of the present invention is preferably an FFS type liquid crystal display element using a fringe electric field, and in the case: where the shortest separation distance between the common electrode 122 and the pixel electrode 121 adjacent to each other is shorter than the shortest separation distance between the alignment films 14 (distance between substrates), a fringe electric field is formed between the common electrode and the pixel electrode, and alignment of the liquid crystal molecules in a horizontal direction and a vertical direction can be efficiently used. In the case of the FFS type liquid crystal display element of the present invention, when a voltage is applied to the liquid crystal molecules that are disposed such that the long axis direction thereof is parallel to the alignment direction of the alignment film, a line of electric force of a parabolic electric field between the pixel electrode 121 and the common electrode 122 is formed up to the upper portion of the pixel electrode 121 and the common electrode 122, and the long axes of the liquid crystal molecules in the liquid crystal layer 15 are arranged to be orthogonal to the electric field that is formed. Accordingly, the liquid crystal molecules can be driven even at low dielectric anisotropy.

It is preferable that the color filter 16 forms black matrix (not shown in the drawings) on a portion that corresponds to a thin-film transistor and a storage capacitor 123, from the viewpoint of preventing leakage of light. The color filter 16 is generally formed of three filters of red (R), green (G), and blue (B) and constitutes one dot of a picture or an image. For example, these three filters are lined up in an extending direction of a gate wiring. The color filter 16 can be produced by a pigment dispersion method, a printing method, an electrodeposition method, or a dyeing method. For example, a method for producing a color filter by the pigment dispersion method will be described. A transparent substrate is coated with a curable coloring composition for a color filter, a patterning treatment is performed, and the composition is cured by heating or irradiation with light. This process is performed for each of the three colors, red, green, and blue, thereby producing a pixel portion for a color filter. In addition, a so-called color filter on array in which a pixel electrode provided with an active element such as a TFT and a thin-film diode is placed on the substrate may be adopted.

The pair of alignment films 14 which directly abut against the liquid crystal composition constituting the liquid crystal layer 15 and induce homogeneous alignment are provided on the electrode layer 13 and the color filter 16.

The polarization axis of each of the polarizing plate 11 and the polarizing plate 18 can be adjusted so as to adjust the view angle or the contrast such that the view angle or the contrast is improved, and the polarizing plates preferably have the transmission axes that intersect at a right angle, such that the transmission axes are operated at a normally black mode. In particular, any one of the polarizing plate 11 and the polarizing plate 18 is preferably disposed such that the transmission axis thereof is parallel to the alignment direction of the liquid crystal molecules. The product of the refractive index anisotropy of the liquid crystal and the cell gap is preferably adjusted such that the contrast becomes maximum. Furthermore, in order to widen the view angle, a phase difference film may be used.

In the case where another embodiment of the liquid crystal display element of the present invention is an IPS type, the shortest separation distance between a common electrode and a pixel electrode adjacent to each other is longer than the shortest separation distance between liquid crystal alignment films. For example, in the case where the common electrode and the pixel electrode are formed on the same substrate and the common electrode and the pixel electrode are alternately disposed, the liquid crystal display element has a structure in which the shortest separation distance between the common electrode and the pixel electrode adjacent to each other is longer than the shortest separation distance between the liquid crystal alignment films.

The liquid crystal display element of the present invention is preferably produced by forming a coating on the surface of a substrate having an electrode layer and/or a substrate, separating a pair of the substrates from each other such that the coatings become the inner sides, disposing the substrates such that they oppose each other, and then filling the space between the substrates with the liquid crystal composition. At this time, the spacing between the substrates is preferably adjusted by sandwiching a spacer therebetween.

The distance between the substrates (the average thickness of the obtained liquid crystal layer; also referred to as a separation distance between the coatings) is preferably adjusted to be 1 to 100 µm. An average separation distance between the coatings is preferably 1.5 to 10 µm.

In the present invention, examples of the spacer used to adjust the distance between the substrates include glass particles, plastic particles, alumina particles, a column spacer formed of a photoresist material, and the like.

The FFS type liquid crystal display element described using FIGS. 5 to 7 is an example of the liquid crystal display element of the present invention, and the liquid crystal display element can be modified in various ways within a scope that does not depart from the technical idea of the present invention.

<<Liquid Crystal Display>>

A liquid crystal display of the present invention includes the liquid crystal display element of the present invention, and the liquid crystal display of the present invention can have the same configuration as that of a known liquid crystal display, except for including the liquid crystal display element of the present invention.

The liquid crystal display of the present invention can used as, for example, a liquid crystal display in image display devices such as a liquid crystal television, a monitor for a computer, a mobile phone, an information terminal, and a game machine.

Example

Hereinafter, the present invention will be more specifically described using Examples, however, the present invention is not limited to these Examples, Example 1 and Comparative Example 1

A liquid crystal composition having a dielectric anisotropy ($\Delta\varepsilon$) was −3.39 was prepared, and a chiral compound was added thereto. Eleven kinds of liquid crystal compositions (Examples 1-1 to 1-9 and Comparative Example 1) which were objects for measurement having different concentrations of the chiral compound were prepared. The helical twisting power (HTP) of the chiral compound is 11.1 $\mu m^{-1}$.

Next, using the cell for a liquid crystal display element having the configuration shown in FIG. 1, $K_{22}$ and $K_{33}$ for the liquid crystal compositions were obtained from Equation (1), and $K_{11}$ was separately obtained, so as to obtain $\Gamma$ values from Equation (2), as described above. These values are shown in Table 1.

Light transmittance was simulated for each liquid crystal composition. The simulation was performed by using a simulation software "LCD Master (2D)" manufactured by SHINTECH, INC. At this time, the behavior of liquid crystal molecules (director) when a voltage was applied to a liquid crystal panel (between electrodes) was computed by a finite difference method (FDM), and an equilibrium state of the director was computed by static analysis under a given voltage condition. Regarding the condition of the cell, the width of the pixel electrode was 3 µm, the space between the pixel electrodes was 4 µm, the thickness of the insulation film between the pixel electrode and the common electrode was 400 nm, the permittivity of the insulation film was 7.0, and the cell gap was 2.8 µm. The maximum values of the obtained light transmittance (maximum light transmittance) are shown in Table 1. In Table 1, "$V_{100}$" represents a driving voltage set when performing the simulation. A graph obtained by plotting the maximum values of the light transmittance and the $\Gamma$ values at this time is shown in FIG. 8.

TABLE 1

| | $K_{11}$ (pN) | $K_{22}$ (pN) | $K_{33}$ (pN) | $\Gamma$ | $V_{100}$ (V) | Maximum transmittance (%) |
|---|---|---|---|---|---|---|
| Example 1-1 | 15.4 | 8.1 | 17.0 | 0.250 | 5.6 | 27.81 |
| Example 1-2 | 18.0 | 8.1 | 17.0 | 0.231 | 5.6 | 28.07 |
| Example 1-3 | 15.4 | 8.1 | 20.0 | 0.229 | 5.5 | 28.02 |
| Example 1-4 | 18.0 | 8.1 | 20.0 | 0.213 | 5.4 | 28.24 |
| Example 1-5 | 13.1 | 8.1 | 14.5 | 0.293 | 5.8 | 27.30 |
| Example 1-6 | 15.4 | 6.9 | 17.0 | 0.213 | 5.0 | 28.25 |
| Example 1-7 | 15.4 | 5.9 | 17.0 | 0.182 | 4.5 | 28.61 |
| Example 1-8 | 21.0 | 8.1 | 17.0 | 0.213 | 5.5 | 28.32 |
| Example 1-9 | 15.4 | 8.1 | 23.5 | 0.208 | 5.4 | 28.21 |
| Comparative Example 1 | 11.1 | 8.1 | 12.3 | 0.346 | 6.1 | 26.68 |

Figure 8:
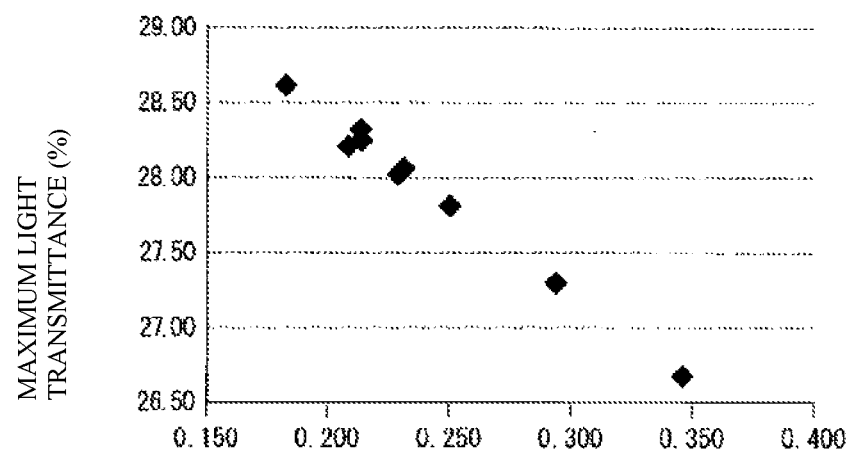
FIG. 8 is a graph obtained by plotting maximum values of light transmittance of the liquid crystal display element with respect to Γ values in Example 1.

As can be clear from Table 1 and FIG. 8, when the $\Gamma$ values of the liquid crystal compositions were 0.182 to 0.346, the maximum transmittance was 26.68% to 28.61%, and it was confirmed that the smaller the Γ value was, the higher the transmittance was. Here, in the case where the driving voltage (V$_{100}$) was limited to 5 to 6 V, it was confirmed that the values of the maximum transmittance were 27.30% to 28.32% when the Γ values were 0.203 to 0.293.

It was possible to determine that, by using the liquid crystal composition, a liquid crystal display element excellent in display characteristics can be configured, within the allowable range of the driving voltage.

In addition, in the case where liquid crystal compositions of: Examples 1-1, 1-6, and 1-7 were used, response time was simulated. At this time, as the driving voltage, a voltage of 4.5 V was applied in all of Examples 1-1, 1-6, and 1-7, as in the case of simulating light transmittance using the liquid crystal composition of Example 1-7. The response time thus obtained is shown in Table 2. In Table 2, "Tr" represents time taken until the light transmittance changes from 10% to 90%, "Td" represents time taken until the light transmittance changes from 90% to 10%, and the response time corresponds to the sum of Tr and Td (response time=Tr+Td). A graph obtained by plotting the response time thus obtained and the Γ values is shown in FIG. 9.

TABLE 2

| | K$_{11}$ (pN) | K$_{22}$ (pN) | K$_{33}$ (pN) | Γ | Tr (ms) | Td (ms) | Tr + Td (ms) |
|---|---|---|---|---|---|---|---|
| Example 1-1 | 15.4 | 8.1 | 17.0 | 0.250 | 16.8 | 14.8 | 31.6 |
| Example 1-6 | 15.4 | 6.9 | 17.0 | 0.213 | 16.8 | 17.6 | 34.4 |
| Example 1-7 | 15.4 | 5.9 | 17.0 | 0.182 | 16.6 | 20.6 | 37.2 |

Figure 9:
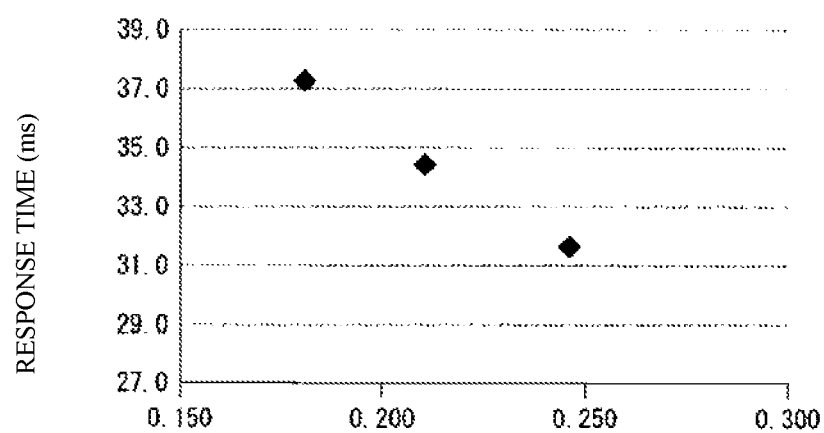
FIG. 9 is a graph obtained by plotting response time of the liquid crystal display element with respect to Γ values in Example 1.

As can be clear from Table 2 and FIG. 9, when the Γ values of the liquid crystal compositions were 0.182 to 0.250, the response time was 31.6 to 37.2 ms, and the greater the Γ value was, the shorter the response time was.

Accordingly, it was possible to determine that, by using a liquid crystal composition having a Γ value controlled by the characteristics required for a liquid crystal display element, a liquid crystal display element excellent in display characteristics can be configured.

INDUSTRIAL APPLICABILITY

The present invention can be used in production of a liquid crystal display having excellent display characteristics.

REFERENCE SIGNS LIST 2, 2A, 2B, 2C cell
21, 23 first substrate
22, 24 second substrate
211A, 211B, 231 first electrode
212A, 212B, 241 second electrode
213 insulation layer
232 first alignment film
242 second alignment film
d$_1$, d$_2$, d$_3$ cell gap
W$_1$, W$_2$ electrode width
L$_1$ distance between electrodes
10 liquid crystal display element
12 first transparent insulating substrate
121 pixel electrode
122 common electrode.
124 gate wiring
125 data wiring
14 alignment film
15 liquid crystal layer
17 second transparent insulating substrate
R distance between electrodes
G distance between substrates

The invention claimed is:

1. A fringe field switching (FFS) liquid crystal display element using a liquid crystal composition having a dielectric anisotropy (Δε) of less than −1.5 and a value of Γ of 0.3 or less, and the FFS liquid crystal display element has a maximum transmittance of 27.30% to 28.32% when the value of Γ is within a range of 0.208 to 0.293 at a driving voltage of 5 to 6 V, wherein the value of Γ is obtained from the following Equation (2) using a twist elastic constant (K$_{22}$) value obtained from the following Equation (1) using measured values of a threshold voltage (Vth); a bend elastic constant (K$_{33}$); a vacuum permittivity (ε$_0$); a cell gap (d); and a helical pitch (P$_0$), and measured values of a splay elastic constant (K$_{11}$) and the bend elastic constant (K$_{33}$) with respect to the liquid crystal composition:

$$V_{th} = \pi \sqrt{\left\{1 - 4\left(\frac{K_{22}}{K_{33}}\right)^2\left(\frac{d}{P_0}\right)^2\right\}\frac{K_{33}}{|\varepsilon_0 \Delta \varepsilon|}} \quad (1)$$

$$\Gamma = \frac{K_{22}}{K_{11} + K_{33}}. \quad (2)$$

2. The FFS liquid crystal display element according to claim 1,
wherein the value of Γ of the liquid crystal composition is 0.01 to 0.3.

3. The FFS liquid crystal display element according to claim 1, comprising:
a first transparent insulating substrate and a second transparent insulating substrate disposed to oppose each other;
a liquid crystal layer containing the liquid crystal composition, which is interposed between the first transparent insulating substrate and the second transparent insulating substrate;
for each pixel, a common electrode formed of a transparent conductive material, a plurality of gate wirings and data wirings arranged in a matrix form, a thin-film transistor provided in the vicinity of a crossing portion of the gate wiring and the data wiring, and a pixel electrode which is formed of the transparent conductive material and is driven by the thin-film transistor, on the first transparent insulating substrate; and
alignment films which induce homogeneous alignment and are present between the liquid crystal layer and the first transparent insulating substrate and between the liquid crystal layer and the second transparent insulating substrate, respectively,
wherein the alignment directions of the alignment films are substantially parallel to the surface of the first transparent insulating substrate or the second transparent insulating substrate, and
in order to form an electric field between the pixel electrode and the common electrode, the common electrode is disposed nearer to the first transparent insulating substrate than the pixel electrode and provided on substantially the entire surface of the first transparent insulating substrate.

4. A fringe field switching (FFS) liquid crystal display comprising:
   the FFS liquid crystal display element according to claim 1.

\* \* \* \* \*